United States Patent [19]
Kodama et al.

[11] Patent Number: 6,129,393
[45] Date of Patent: Oct. 10, 2000

[54] QUICK CONNECTOR ASSEMBLY

[75] Inventors: Tsutomu Kodama, Komaki; Tomohide Ito, Kasugai; Akira Takayanagi, Aichi-ken, all of Japan

[73] Assignee: Tokai Rubber Industries, Ltd, Komaki, Japan

[21] Appl. No.: 09/189,406

[22] Filed: Nov. 10, 1998

[30] Foreign Application Priority Data

Nov. 11, 1997 [JP] Japan .................................. 9-308796
Sep. 9, 1998 [JP] Japan ................................. 10-255662

[51] Int. Cl.$^7$ ....................................................... F16L 39/00
[52] U.S. Cl. ............................................. 285/319; 285/93
[58] Field of Search ............................... 285/319, 93, 38, 285/305

[56] References Cited

U.S. PATENT DOCUMENTS

| | | |
|---|---|---|
| 4,601,497 | 7/1986 | Bartholomew . |
| 5,152,555 | 10/1992 | Szabo ........................................ 285/93 |
| 5,785,358 | 7/1998 | Kujawski et al. ........................ 285/93 |
| 5,893,590 | 4/1999 | Klinger et al. ........................... 285/319 |
| 5,897,145 | 4/1999 | Kondo et al. ............................ 285/319 |
| 5,931,509 | 8/1999 | Bartholomew .......................... 285/319 |

FOREIGN PATENT DOCUMENTS

| | | | |
|---|---|---|---|
| 7-71673 | 3/1995 | Japan . | |
| 2235267 | 2/1991 | United Kingdom ................... 285/319 |
| 2240150 | 7/1991 | United Kingdom ................... 285/319 |
| WO 94/08172 | 4/1994 | WIPO .................................... 285/319 |

*Primary Examiner*—Lynne H. Browne
*Assistant Examiner*—Aaron Dunwoody
*Attorney, Agent, or Firm*—Oblon, Spivak, McClelland, Maier & Neustadt, P.C.

[57] ABSTRACT

A quick connector assembly includes a male member, a female member, and a retainer. The retainer is interposed between a ring-shaped projection of the male member and a first engagement portion of the female member to connect the male member and female member. When a worker holds operation end portions of the retainer with his or her fingers, the retainer is reduced diametrically so that a second engagement portion of the retainer disengages from the first engagement portion of the female member. Accordingly, the male member and retainer can be pulled off from the female member easily. The retainer holds the male member by fitting its aperture windows with the ring-shaped projection of the male member. Consequently, the retainer hardly falls down from the male member after it is removed from the female member. The male member can be removed sidewise through a substantially-letter-C-shaped opening of the retainer while diametrically enlarging a cross-sectionally substantially-letter-C-shaped body of the retainer. Thus, the retainer is deformed so less that it can be reused repeatedly a number of times.

16 Claims, 23 Drawing Sheets

QUICK CONNECTOR ASSEMBLY

BACKGROUND OF THE INVENTION

1. Field of the Invention

The present invention relates to a quick connector assembly for piping. The quick connector assembly includes a male member and a female member which are connected with each other to connect hoses or pipes for transferring a variety of fluids. Thus, the present invention belongs to an engineering field of piping connector technologies.

2. Description of the Related Art (First Type Conventional Quick Connector Assembly)

There has been a first type conventional quick connector assembly as disclosed in U.S. Pat. No. 4,601,497. As illustrated in FIGS. 25 through 27, the quick connector assembly comprises a male member 72, a female member 77, and a retainer 78.

As illustrated in FIG. 25, the male member 72 is a cylinder-shaped member, and has an insertion end portion 71 on which a ring-shaped projection 70 is disposed to project in centrifugal direction at a position away from the tip by a predetermined distance. Whilst, the female member 77 comprises a substantially-cylinder-shaped housing 76 on an end in an axial direction. This housing 76 includes an insertion opening end portion 73 into which the insertion end portion 71 of the male member 72 is inserted, a receiving portion 74 which is disposed inside the insertion opening end portion 73 in the axial direction, and a first engagement portion 75 which is disposed in the receiving portion 74. The retainer 78 is inserted into the receiving portion 74 from the insertion opening end portion 73 so as to be accommodated in the receiving portion 74, and is a member for connecting the male member 72, which is fitted from the insertion opening end portion 73, with the female member 77.

As illustrated in FIG. 26, the retainer member 78 includes an annular collar 79 which has an inside diameter substantially equal to an outside diameter of the insertion end portion 71 of the male member 72, and three legs 80 which extend integrally from the annular collar 79 in the axial direction. The legs 80 are elastically deformable in a radial direction inward and outward in the receiving portion 74 of the female member 77. Further, the legs 80 include an engagement concavity 81 on the inner-surface side. The engagement concavity 81 can engage with the ring-shaped projection 70 of the male member 72 which is fitted from the insertion opening end portion 73 of the female member 77. Furthermore, the legs 80 include a second engagement portion 82 on the outer-surface side. The second engagement portion 82 can engage with the first engagement portion 75 of the female member 77.

Thus, the first type conventional quick connector assembly is connected in the following procedure. First, the male member 72 is inserted into the retainer 78 while elastically deforming the legs 80 of the retainer 78 by the ring-shaped projection 70 of the male member 72 in a radial direction outward. Then, the ring-shaped projection 70 of the male member 72 fits in the engagement concavity 81 of the retainer 78 to engage therewith. Thereafter, the retainer 78 holding the male member 72 is inserted into the female member 77, the second engagement portion 82 of the retainer 78 fits in the first engagement portion 75 of the female member 72 to engage therewith. Consequently, the male member 72 and female member 77 are connected with each other by interposing the retainer 78 between the male member 72 and female member 77.

(Second Type Conventional Quick Connector Assembly)

Japanese Unexamined Patent Publication (KOKAI) No. 7-71,673 discloses a second type conventional quick connector assembly. The second type conventional quick connector assembly comprises a retainer having a letter C shape in cross-section whose arrangements and operations are different from the retainer 78 of the first type conventional quick connector assembly.

As illustrated in FIG. 28, the second type conventional quick connector assembly comprises a male member 72, a female member 77, a retainer 90, and sealing members such as O-rings. Moreover, as illustrated in FIG. 29, the retainer 90 comprises a body 92, second engagement portions 93, and operation arms 94.

The arrangements of the retainer 90 will be hereinafter described in detail. The body 92 comprises a C-ring-shaped tapered wall. The C-ring-shaped tapered wall can enlarge diametrically by elastic deformation in the receiving portion 74 of the female member 77, and is tapered from a large diameter to a small diameter in the axial direction from an end (i.e., left side in FIG. 28) to other end (i.e., right side in FIG. 28). The retainer 90 further has contacts 91 on the minor-diameter side of the body 92. When the male member 72 and female member 77 are connected, the contacts 91 prevent the male member 72 from coming off in the axial direction toward the one end. The second engagement portions 93 are formed integrally on an outer peripheral surface on the major-diameter side of the body 92, and are detents which engage with a first engagement portion 75 of the female member 77. The operation arms 94 are formed on the major-diameter-side end surface of the body 92, and operate to cancel the engagement between the first engagement portion 75 and second engagement portions 93 by reducing the diameter of the major-diameter-end side of the body 92.

Thus, the second type conventional quick connector assembly is connected in the following procedure. First, the male member 72 is inserted into the retainer 90 while enlarging the body 92 of the retainer 90 diametrically by elastic deformation with the ring-shaped projection 70 of the male member 72. Accordingly, the ring-shaped projection 70 of the male member 72 contacts with the contacts 91 of the retainer 90. Then, the insertion end portion 71 of the male member 72, and the retainer 90 are inserted into the female member 77 by pressing the retainer 90. Accordingly, the first engagement portion 75 of the female member 77 fits with the second engagement portions 93 of the retainer 78, thereby engaging the retainer 90 with the female member 72. Consequently, the male member 72 is prevented from coming off from the female member 77 by interposing the retainer 90 between the ring-shaped projection of the male member 72 and the first engagement portion 75 of the female member 77. Thus, the male member 72 and female member 77 are connected with each other by the retainer 90.

(Problems with First Type Conventional Quick Connector Assembly)

In the first type conventional quick connector assembly, when separating the male member 72 and female member 77, the legs 80 of the retainer 78 are deformed elastically in the radial direction inward to cancel the engagement between the first engagement portion 75 of the female member 77 and the second engagement portions 82 of the retainer 78. Then, under the circumstances, the male member 72 is pulled off from the female member 77 together with the retainer 78 in the axial direction. Accordingly, the male 72 and female member 77 can be separated.

After the male member 72 and female member 77 are thus separated, the insertion end portion 71 of the female member 72 is still inserted into the annular collar 79 of the retainer 78. Moreover, the ring-shaped projection 70 of the male member 72 engages with the engagement concavity 81 of the retainer 78. Consequently, the retainer 78 holds the male member 72.

However, when removing the retainer 78, held onto the male member 72, from the male member 72, and if the aforementioned state is kept, the retainer 78 cannot be pulled off from the male member 72 in the axial direction or in a direction perpendicular to the axial direction. Accordingly, the legs 80 of the retainer 78 are deformed so as to warp greatly in the radial direction outward so that the engagement concavity 81 of the retainer 78 is disengaged from the ring-shaped projection 70 of the male member 72. Then, the retainer 78 should be pulled off from the male member 72 in the axial direction. Consequently, the great deformation of the legs 80 of the retainer 78 may result in fractures. Thus, not only it is hard to remove the retainer 78, but also it is difficult to reuse the retainer 78.

Whilst, a releasing jig can be prepared independently. After separating the male member 72 and female member 77, the releasing jig is inserted inside the legs 80 to elastically deform the legs 80 in the radial direction outward. The engagement between the engagement concavity 81 and ring-shaped projection 70 can be canceled. In this way, it is possible to pull off the retainer 78 from the male member 72 in the axial direction without greatly deforming the legs 80. The releasing jig is a special jig which has a cylinder-shaped member at the leading end. The cylinder-shaped member has an inside diameter which is slightly larger than the outside diameter of the male member 72, and an outside diameter which is substantially equal to the outside diameter of the ring-shaped projection 70. However, not only it is cumbersome to prepare such a releasing jig on actual manufacturing sites, but also it is difficult in many occasions to fit the male member 72, which is connected with a pipe, etc., into the releasing jig. Therefore, even if the releasing jig is used, it is hard to say that the retainer 78 can be removed from the male member 72 with ease.

Thus, in the first type conventional quick connector assembly, not only it is hard to remove the retainer 78, but also it is difficult to reuse the retainer 78.

(Problems with Second Type Conventional Quick Connector Assembly)

In the second type conventional quick connector assembly, the male member 72 and female member 77 are separated in the following procedure. First, the operation arms 94 of the retainer 90 are pressed to reduce the diameter of the body 92 on the major-diameter-end side. Consequently, the engagement between the second engagement portions 93 and the first engagement portion 75 of the female member 77 are canceled. Under the circumstances, the male member 72 is pulled off from the female member 77 together with the retainer 90 in the axial direction. Accordingly, the male 72 and retainer 90 can be separated from the female member 77 as a whole.

However, after the male member 72 and female member 77 are separated, the retainer 90 is not at all prevented from coming off from the male member 72 in an opposite direction with respect to the tip of the insertion end portion 71. Accordingly, when the retainer 90 is pulled off from the female member 71 together with the male member 72, the retainer 90 is displaced greatly to the opposite side of the tip of the insertion end portion 71 with respect to the male member 72. Thus, there arises a problem in that the operability is deteriorated in the subsequent process.

In addition, when the male member 72 is pulled off from the female member 77 to disconnect the second type conventional quick connector assembly as aforementioned, the retainer 90 is not engaged with the male member 72. Therefore, there is a possibility of losing the retainer 90 because the retainer 90 falls down along the male member 72. This makes it difficult to reuse the retainer 90, and should be strictly prevented on actual manufacturing sites where the existence of foreign materials results in problems. Hence, it is necessary to disconnect the quick connector assembly with the greatest possible care.

SUMMARY OF THE INVENTION

It is an object of the present invention to provide a novel quick connector assembly which has an easily reusable retainer, and which can be disconnected and disassembled easily without employing a jig, such as a releasing jig, etc.

A quick connector assembly according to the present invention comprises:

a male member including a substantially-pipe-shaped insertion end portion, the insertion end portion having a ring-shaped projection disposed away from a tip by a predetermined distance and projecting in centrifugal direction;

a female member including an insertion opening end portion, and a receiving portion, the insertion opening end portion being opened on one side in an axial direction, the receiving portion including a peripheral wall, the peripheral wall including a first engagement portion, the first engagement portion having an engagement surface facing other side in the axial direction and extending in a radial direction, whereby the insertion end portion of the male member is inserted into the receiving portion from the insertion opening end portion; and a retainer, at least part of the retainer inserted into the receiving portion from the insertion opening end portion of the female member, interposed between the ring-shaped projection of the male member and the engagement surface of the female member, whereby the insertion end portion of the male member, the insertion end portion being inserted into the receiving portion from the insertion opening end portion, is installed in the receiving portion of the female member, the retainer including:

a body formed as a substantially letter C shape in cross-section, being capable of enlarging and reducing diametrically by elastic deformation, and having: a tapered wall whose inner peripheral surface is reduced diametrically toward the other side; and a holding portion disposed at an other-side end of the tapered wall, and fitting with the ring-shaped projection of the insertion end portion of the male member to hold the insertion end portion;

a second engagement portion formed as a detent, and engaging with the first engagement portion, the detent projecting from a one-side end of the body in centrifugal direction and formed integrally with the body; and a plurality of operation arms projecting from the one-side end of the body toward the one side, and disposed back to back, having an operation end portion protruding beyond the insertion opening end portion, and disengaging the second engagement portion from the first engagement portion by reducing the body diametrically.

Note that, in many cases, quick connector assemblies are shipped out of manufacturing plants without male members. Accordingly, a quick connector assembly comprising the female member and the retainer can be also classified as the present quick connector assembly. In this case, a male member is inserted into the quick connector assembly on assembly sites in order to carry out the function of connecting pipes. In addition, the retainer used for the above-described present quick connector assembly is also placed in the category of the present invention, because it has full of distinctive features.

The present quick connector assembly operates as follows. The present quick connector assembly acts in two ways, connection and disconnection. First, the present quick connector assembly can be connected in both of the following two procedures.

The first connecting procedure is carried out as follows. The insertion end portion of the male member is held by the retainer, and the male member is sub-assembled with the retainer. In the sub-assembled state, the insertion end portion of the male member is inserted into the receiving portion of the female member together with the retainer, thereby engaging the second engagement portion of the retainer with the first engagement portion of the female member.

In the first connecting procedure, when holding the insertion end portion of the male member with the retainer, the tip (i.e., leading end) of the male member is first inserted into the retainer from the one-side end of the retainer while aligning the axes of the male member and retainer substantially. Then, the outer peripheral surface of the ring-shaped projection, disposed on the insertion end portion of the male member, contacts with the inner peripheral surface of the tapered wall of the retainer. While the ring-shaped projection expands the cross-sectionally substantially-letter-C-shaped body of the retainer, the male member is inserted into the body toward the other side of the body. When the male member is inserted further deep into the retainer, and when the ring-shaped projection of the male member reaches the holding portion of the retainer, the ring-shaped projection fits with the holding portions naturally, and the body of the retainer holds the insertion end portion of the male member. Thus, the male member and retainer are sub-assembled.

Thereafter, the first engagement portion of the female member and the second engagement portion of the retainer are positioned in a peripheral direction. The insertion end portion of the male member is inserted into the receiving portion of the female member together with the retainer. When the insertion end portion is inserted into the receiving portion by a predetermined insertion depth, the first engagement portion and second engagement portion engage with each other. As a result, the body and second engagement portion of the retainer are interposed between the ring-shaped projection of the male member and the engagement surface of the first engagement portion of the female member so that the male member cannot be pulled off from the female member. Thus, the connection between the male member and female member is completed.

The second connecting procedure is carried out as follows. The retainer is inserted into the receiving portion of the female member. The second engagement portion of the retainer is engaged with the first engagement portion of the female member to hold the retainer in the receiving portion of the female member. Thereafter, the insertion end portion of the male member is inserted into the receiving portion of the female member and the retainer.

In the second connecting procedure, the first engagement portion of the female member and the second engagement portion of the retainer are first positioned in a peripheral direction. Then, the retainer is inserted into the receiving portion of the female member. When the retainer is inserted into the receiving portion by a predetermined insertion depth, the first engagement portion and second engagement portion engage with each other. As a result, the retainer is held in the receiving portion of the female member so that it is prevented from coming off from the receiving portion of the female member. Here, the operation ends of the operation arms of the retainer are kept being protruded beyond the insertion opening end portion of the female member toward the one side. Moreover, the retainer is held in the receiving portion of the female member so that it is prevented from being inserted deeper into the female member.

Thereafter, the tip of the male member is first inserted into the retainer from the one-side end of the retainer and female member while aligning the axes of the male member, the female member and the retainer substantially. Then, the outer peripheral surface of the ring-shaped projection, disposed on the insertion end portion of the male member, contacts with the inner peripheral surface of the tapered wall of the retainer. While the ring-shaped projection expands the cross-sectionally substantially-letter-C-shaped body of the retainer, the male member is inserted into the body toward the other-side end. When the male member is further inserted into the retainer, and when the ring-shaped projection of the male member reaches the holding portion of the retainer, the ring-shaped projection fits with the holding portion naturally, and the body of the retainer holds the insertion end portion of the male member. Then, the body and second engagement portion of the retainer are interposed between the ring-shaped projection of the male member and the engagement surface of the first engagement portion of the female member so that the male member cannot be pulled off from the female member. Thus, the connection between the male member and female member is completed.

Therefore, it is extremely easy to connect the present quick connector assembly. Before the connection, the retainer is prevented from falling down, because the retainer is held onto the female member or male member. In addition, when one of the male member and female member is fastened, it is possible to carry out the connecting operation of the present quick connector assembly with one hand.

Whilst, the present quick connector assembly is disconnected and disassembled in the following manner.

In the present quick connector assembly, the retainer includes a cross-sectionally substantially-letter-C-shaped body, a second engagement portion, and operation arms. The body has a tapered wall and holding portions, and can deform elastically. The second engagement portion is a detent which engages with the first engagement portion of the female member. The operation arms protrude beyond (or from the inside of) the female member. Even when the retainer is inserted into the receiving portion of the female member, the operation arms are separated from the outer peripheral surface of the male member, because the operation arms are urged outward by an elastic force of the body. Not only the operation arms, but also the tapered wall of the body is separated from the outer peripheral surface of the male member. Hence, when the operation end portions of the operation arms are pressed and contracted with fingers in the centripetal direction, the tapered wall of the body is also reduced diametrically in the centripetal direction. As the tapered wall is reduced diametrically, the second engagement portion is disengaged from the first engagement portion of the female member in the centripetal direction. Accordingly, the male member and retainer can be removed from the female member by pulling the male member.

Meanwhile, the retainer engages with the insertion end portion of the male member and keeps the integrally sub-assembled state with the male member, because the ring-shaped projection of the male member fits in the holding portion of the retainer. Hence, even when the male member and retainer are pulled off from the female member, the retainer does not fall off from the male member inadvertently.

In order to remove the retainer from the male member by disassembling the male member and retainer, the retainer can be pulled outward in a direction perpendicular to the axial direction so that the insertion end portion of the male member comes out of the opening of the cross-sectionally substantially-letter-C-shaped body. In the meantime, the cross-sectionally substantially-letter-C-shaped body can be enlarged only to such an extent that the body of the retainer is enlarged diametrically so as to allow the ring-shaped projection of the male member pass through the opening of the cross-sectionally substantially-letter-C-shaped body. Thus, the retainer is prevented from deforming greatly. Hence, it is easy to remove the retainer from the male member. In addition, when removing the retainer from the male member, the inconvenience, such as the fracture of the retainer due to the large deformation, is prevented from happening. Moreover, not to mention, when the male member is fastened, but when it is not fastened, a worker can remove the retainer from the male member with one hand. Hence, it is extremely easy to remove the retainer from the male member.

Therefore, the present quick connector assembly produces the following advantages. Not only it is easy to reuse the retainer, but also it is easy to disconnect and disassemble the present quick connector assembly without employing a jig, such as a releasing jig, etc.

In the present quick connector assembly described above, the retainer can be formed as an integrally molded member out of a resin which can deform with an appropriate elasticity. The holding portion of the retainer can be a part of the retainer which opens toward the inside, and which has a groove with which the ring-shaped projection of the male member fits. Alternatively, the holding portion can be apart of the retainer which penetrates from the inner side surface to the outer side surface, and which has an aperture window with which the ring-shaped projection of the male member fits. Such a groove or an aperture window cannot necessarily fit with the ring-shaped projection of the male member snugly in the axial direction, but can fit therewith with remarkably loose fit. Whilst, such a groove or aperture window can preferably fit with the ring-shaped projection of the male member snugly in the radial direction, but cannot be done so necessarily. The groove or aperture window can fit with the ring-shaped projection with loose fit.

Each of the operation arms of the retainer has an operation end portion (or tab). When the present quick connector assembly is connected, the operation end portions protrude beyond the insertion end opening of the female member. The operation end portions can preferably be formed so as to project in centrifugal direction. With this arrangement, the retainer is likely to reduce diametrically when a worker pinches the operation end portions with the finger tips to disconnect the present quick connector assembly. Thus, the operability can be improved. In view of the operation, the operation arms can most preferably be prepared in a pair, operation arms which are disposed back to back. This is because, if the operation arms are prepared in a pair, the worker can disconnect the present quick connector assembly by pinching the operation end portions (or tabs ) of the operation arms with the thumb and index finger.

The female member can be formed as an integrally molded member out of a resin or a cast metal as far as the material exhibits a relatively high rigidity. The female member includes the first engagement portion having the engagement surface. The first engagement portion can be a groove which is formed in the inner peripheral surface of the receiving portion, and which has a perpendicular surface working as the engagement surface. Alternatively, the first engagement portion can be a window which is formed to penetrate through the peripheral wall of the receiving portion, and which has an opening inner surface working as the engagement surface. Moreover, the receiving portion of the female member can preferably hold a sealing member, such as an O-ring, therein, in order to secure a water proof and air proof properties between itself and the substantially-cylinder-shaped insertion end portion of the male member. In addition, the female member can further preferably have a contact surface or a collar having a contact surface. The contact surface contacts with the other-side-end surfaces of the holding portion of the retainer to prevent the male member from being inserted into the female member more than required. With this arrangement, the insertion depth of the male member can be securely regulated in the appropriate range, because a part of the holding portion of the retainer are held between the other-side-end surface of the ring-shaped projection of the male member and the female member.

The male member can be formed out of a metallic material, such as a stainless steel, or a nonmetallic material, such a resin, as far as the material exhibits a rigid strength, a chemical stability and a heat resistance sufficient for the service purposes.

The above-described present quick connector assembly can preferably be carried out in the following arrangements.

An outer side surface of the body of the retainer can preferably have an inclined surface which approaches the axis as it develops from the second engagement portion to the other side. Conversely speaking, the inclined surface is an outer side surface which expands gradually outward as it comes from one-side end of the holding portions of the retainer and arrives at the second engagement portion. There can or cannot be a step between the inclined surface and the second engagement portion. In this arrangement, when fitting the retainer into the receiving portion of the female member, the inclined surface of the retainer contacts with the inner peripheral end of the insertion opening end portion of the female member, and the body of the retainer is reduced diametrically as the retainer is inserted into the female member. Hence, this arrangement produces an advantage in that the retainer can be inserted into the receiving portion of the female member smoothly.

The first engagement portion can preferably be a pair of windows which face with each other and which are opened in the peripheral wall of the receiving portion, and the engagement surface of the first engagement portion can preferably be part of an opening inner surface of the windows. In this arrangement, it is possible to see through the windows of the female member how the retainer is inserted into the receiving portion of the female member and how the second engagement portion of the retainer engages with the first engagement portion. Thus, it is possible to visually check the engagement between the first engagement portion and second engagement portion. Accordingly, this arrangement can prevent the inconvenience of the imperfect engagement between the retainer and female member, because the engagement between the female member and retainer can be checked securely. The imperfect engagement occurs when the retainer is inserted into the female member shallowly, or when the retainer is placed improperly in a peripheral direction with respect to the female member. Hence, this arrangement produces an advantage in that the retainer can be installed in the receiving portion of the female member more securely so that the present quick connector assembly can be connected more reliably.

The holding portion of the retainer can preferably include an aperture window with which part of the ring-shaped projection of the male member fits. In this arrangement, it is possible to visually check that the ring-shaped projection of the male member fits with the holding portion of the retainer when the retainer is assembled with the male member. Hence, this arrangement produces an advantage in that the present quick connector assembly can be connected more reliably, because the retainer and insertion end portion can be inserted into the female member while the holding portion of the retainer hold the insertion end portion of the male member securely.

In the arrangement immediately above, the receiving portion of the female member can further preferably include a window in the peripheral wall. The window is disposed at a position at which the aperture window of the retainer is observed from the outside. In this arrangement, when the ring-shaped projection of the male member fits with the aperture windows of the retainer, it is possible to visually check through the window of the receiving portion that the insertion end portion of the male member and the retainer are inserted into the receiving portion of the female member. Hence, this arrangement produces an advantage in that the present quick connector assembly can be connected more reliably even when it is connected by either of the aforementioned connecting procedures.

The body of the retainer can preferably include a plurality of the holding portions and a cut-off between the holding portions neighboring in a peripheral direction. The cut-off is formed from the other side. In this arrangement, the cut-off is formed at a peripheral intermediate position in the cross-sectionally substantially-letter-C-shaped retainer. Consequently, it is easy to deform the retainer, because the rigidity decreases in the body of the retainer. For instance, when the retainer is mounted to or dismounted from the male member, or when the insertion end portion of the male member held onto the retainer is inserted into or pulled off from the receiving portion of the female member, the retainer is deformed with ease. Note that the deformation of the retainer includes not only the diametric reduction and expansion of the body but also the flexural deformation thereof which is not symmetric rotationally. When the retainer includes the cut-off, the flexural deformation can occur particularly easily. Hence, this arrangement produces an advantage in that less forces are required to carry out the assembly, connection, disconnection and disassembly of the present quick connector assembly so that these operations can be carried out more easily.

In the arrangement immediately above, the female member can preferably include a fitting projection. The fitting projection projects from an inner peripheral wall of the accommodation in a centripetal direction by a predetermined thickness, and is capable of fitting with the cut-off of the retainer when the retainer is inserted into the receiving portion. In the arrangement, the fitting projection projects from an inner peripheral wall of the receiving portion. Accordingly, only if either one of the cut-off and the opening of the cross-sectionally substantially-letter-C-shaped retainer fits with the fitting projection, the retainer holding the male member can be inserted sufficiently deep into the receiving portion of the female member. For instance, as far as the fitting projection is formed at an appropriate position in the receiving portion of the female member, the retainer holding the male member is prevented from being inserted sufficiently deep into the male member when the retainer is placed at inappropriate rotary angle positions. As a result, the worker can easily tell that the retainer is placed at inappropriate rotary angle positions, and accordingly can rotate it to the appropriate rotary angle position. Hence, this arrangement produces an advantage in that the retainer can be prevented from being inserted into the female member at inappropriate rotary angle positions so that the present quick connector assembly can be connected more reliably.

The female member can preferably include a regulatory projection formed on the insertion opening end portion. The regulatory projection is disposed at a position different from the position where the first engagement portion is disposed in a peripheral direction, and projects by a predetermined thickness in a centripetal direction. Here, the regulatory projection works as a projection which prevents the retainer from being inserted into the receiving portion of the female member by contacting with the second engagement portion of the retainer when the retainer mounted onto the male member is out of an appropriate rotary angle position. In this arrangement, when the retainer holding the male member is inserted into the insertion opening end portion of the female member, and when the retainer is not at the appropriate rotary angle position, the retainer cannot go inside from the regulatory projection of the female member, because the second engagement portion of the retainer projects outward and contacts with the end surface of the regulatory projection. Then, even if a worker tries to push the male member into the female member, the second engagement portion of the retainer does not go into the insertion opening end portion of the female member. Accordingly, it is apparent that the male member and retainer is inserted into the female member only by an insufficient depth. As a result, it is evident that the retainer is not placed at the appropriate rotary angle position with respect to the female member. Consequently, the worker should rotate the retainer to the appropriate rotary angle position in a peripheral direction. Hence, this arrangement produces an advantage in that the retainer can be prevented from being inserted into the female member at inappropriate rotary angle positions so that the present quick connector assembly can be connected more reliably.

In the arrangement immediately above, the retainer can preferably include a regulatory flat surface. The regulatory flat surface is disposed on the other side of the second engagement portion, and is formed perpendicularly to the axial direction. Here, the regulatory flat surface works as a flat surface which prevents the retainer from being inserted into the receiving portion of the female member by contacting with an end surface of the regulatory projection of the female member when the retainer mounted onto the male member is out of an appropriate rotary angle position. In this arrangement, when the retainer holding the male member is inserted into the insertion opening end portion of the female member, and when the retainer is not at the appropriate rotary angle position, the regulatory flat surface of the second engagement portion contacts with an end surface of the regulatory projection of the female member, because the second engagement portion of the retainer projects outward. Then, even if the worker tries to push the male member into the female member, the second engagement portion of the retainer does not go into the insertion opening end portion of the female member. Accordingly, the male member and retainer can be inserted into the female member only by such a depth that the second engagement portion of the retainer is exposed. As a result, it is evident that the retainer is not placed at the appropriate rotary angle position with respect to the female member. Consequently, the worker should rotate the retainer to the appropriate rotary angle position in a peripheral direction. Hence, this arrangement also produces an advantage in that the retainer can be prevented from being inserted into the female member at inappropriate rotary angle positions so that the present quick connector assembly can be connected more reliably.

The female member can preferably include a chamfer-like guiding tapered surface. The chamfer-like guiding tapered surface is formed on a specific portion in the insertion opening end portion, specific portion which corresponds to the first engagement portion, and continues from an end surface of the insertion opening end portion to an inner peripheral wall of the receiving portion. In this arrangement, contrary to the arrangement immediately above, when the second engagement portion of the retainer is placed at a position, which corresponds to the first engagement portion of the female member, in a peripheral direction, the detent of the second engagement portion of the retainer contacts slidably with the chamfer-like guiding tapered surface, which is formed in the insertion end opening of the female member. Specifically, the second engagement portion of the retainer is smoothly inserted into the receiving portion of the female member while it is slidably guided by the chamfer-like guiding tapered surface, and while it is subjected to a pressure in a centripetal direction. The smooth insertion of the second engagement portion can be effected only when the retainer is placed at the appropriate rotary angle position with respect to the female member. Hence, this arrangement produces an advantage in that the retainer is likely to be inserted into the female member at the appropriate rotary angle position so that the present quick connector assembly can be connected more reliably.

In the arrangement immediately above, the female member can preferably include a pair of guiding inclined surfaces. The guiding inclined surfaces are disposed at opposite ends of the chamfer-like guiding tapered surface, and continue from the end surface of the insertion opening end portion to the chamfer-like guiding tapered surface. In this arrangement, even when the second engagement portion of the retainer is deviated from the appropriate rotary angle slightly, the retainer can be inserted into the female member while a corner of the second engagement portion of the retainer slidably contacts with the guiding inclined surface of the female member. Specifically, as the retainer is inserted into the female member, the retainer is naturally rotated to more appropriate rotary angle positions while the second engagement portion of the retainer slidably contacts with the guiding inclined surface of the female member. As a result, until the second engagement portion of the retainer is inserted into the receiving portion of the female member, the retainer finishes rotating to the appropriate rotary angle position with respect to the female member. Consequently, the second engagement portion of the retainer comes to properly engage with the first engagement portion of the female member. Hence, this arrangement produces an advantage in that the present quick connector assembly can be connected more easily.

When the regulatory projection of the female member extends in a peripheral direction by a predetermined width, and when the regulatory projection has a flat regulatory end surface which projects from the end surface of the insertion opening end portion and which is parallel to the end surface of the insertion opening end portion, the arrangement immediately above can be made much more effective by modifying a little. For instance, when a guiding inclined surface is formed continuously so as to come from the regulatory end surface and arrive at the chamfer-like guiding tapered surface, the present quick connector assembly can be connected more easily. This advantage results from the following operations. Even when the retainer holding the male member is at inappropriate rotary angle positions with respect to the female member, the worker rotates the retainer slightly in a peripheral direction so that the second engagement portion of the retainer can be simply displaced a bit from the regulatory projection of the female member and the regulatory end surface of the regulatory projection. Accordingly, as the retainer is inserted into the female member, the retainer is guided by the guiding inclined surface so that the retainer can be placed naturally at the correct rotary angle position. As a result, the second engagement portion of the retainer engages with the first engagement portion of the male member.

The receiving portion of the female member can preferably have a major-diameter portion, an intermediate-diameter portion, and a minor-diameter portion. The major diameter portion accommodates the ring-shaped projection of the male member and the body and second engagement portion of the retainer. The intermediate-diameter portion has an inside diameter smaller than that of the major-diameter portion and holds a ring-shaped sealing member which contacts with an inner peripheral surface of the receiving portion and an outer peripheral surface of the insertion end portion of the male member. The minor-diameter portion has an inside diameter smaller than that of the intermediate-diameter portion and accommodates the tip of the male member. In the arrangement, since the leading end of the female member is held by the minor-diameter portion of the female member, the posture of the male member is stabilized with respect to the female member, and accordingly there arises no shaking between the male member and female member. Thus, the present quick connector assembly can be connected more stably. Since the ring-shaped sealing member is held between an outer peripheral surface of the insertion end portion of the male member and an inner peripheral surface of the intermediate-diameter portion, there are provided high water-proof and air-proof properties between the male member and female member. As a result, fluids, flowing in the preset quick connector assembly, can be prevented from leaking to the outside effectively. Hence, this arrangement produces advantages in that the present quick connector assembly can be connected more stably, and in that the present quick connector assembly can be improved in terms of the water-proof and air-proof properties.

The receiving portion of the female member can preferably include windows opened in the peripheral wall, and the present quick connector assembly can preferably further comprise a checking member. The checking member includes a letter-C-shaped portion, and a pair of engagement projections. The letter-C-shaped portion is installed to the receiving portion from an outer peripheral side of the receiving portion of the female member, and is capable of enlarging diametrically by elastic deformation. The engagement projections project from opposite ends of the letter-C-shaped portion in a radial direction inward, and are inserted into the aperture window of the holding portion of the retainer by way of the windows of the receiving portion. Here, when the connection between the male member and female member is completed, the checking member operates so that the engagement projections are pushed out of the aperture window of the holding portion of the retainer in centrifugal direction by an outer peripheral surface of the ring-shaped projection of the male member, and the letter-C-shaped portion is enlarged diametrically. For instance, when the retainer is inserted into the female member to engage the first engagement portion and the second engagement portion with each other, the pair of engagement projections of the checking member are inserted into the aperture window of the retainer by way of the windows of the female member. Under the circumstances, the checking member engages with the windows of the female member, and does not come off from the female member even when the checking member is pulled in a radial direction. However, when the insertion end portion of the male member is inserted into the female member and retainer appropriately so that the ring-shaped projection of the male member is held in the aperture window of the retainer, the ring-shaped projection contacts with the leading ends of the engagement projections of the checking member to push the engagement projections outward. As a result, the letter-C-shaped portion of the checking member is enlarged diametrically to cancel the engagement between the letter-C-shaped portion and the windows of the female member. Thus, when the checking member is pulled in a radial direction, the checking member is removed from the female member. Specifically, after fitting the male member into the female member and retainer to connect the present quick connector assembly, the worker can tell whether the present quick connector assembly is connected appropriately by pulling the checking member and removing the checking member from the female member without carrying out a visual inspection. Thus, even when operations should be carried out by groping deep inside facilities, the present quick connector assembly can be justified that it is connected appropriately without carrying out a visual inspection. Hence, the arrangement produces an advantage in that the reliability can be upgraded even when the present quick connector assembly is connected by groping.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Examples of the present quick connector assembly will be hereinafter described in detail with reference to the accompanying drawings.

Example No. 1
(Arrangement of Example No. 1)

Figure 1:
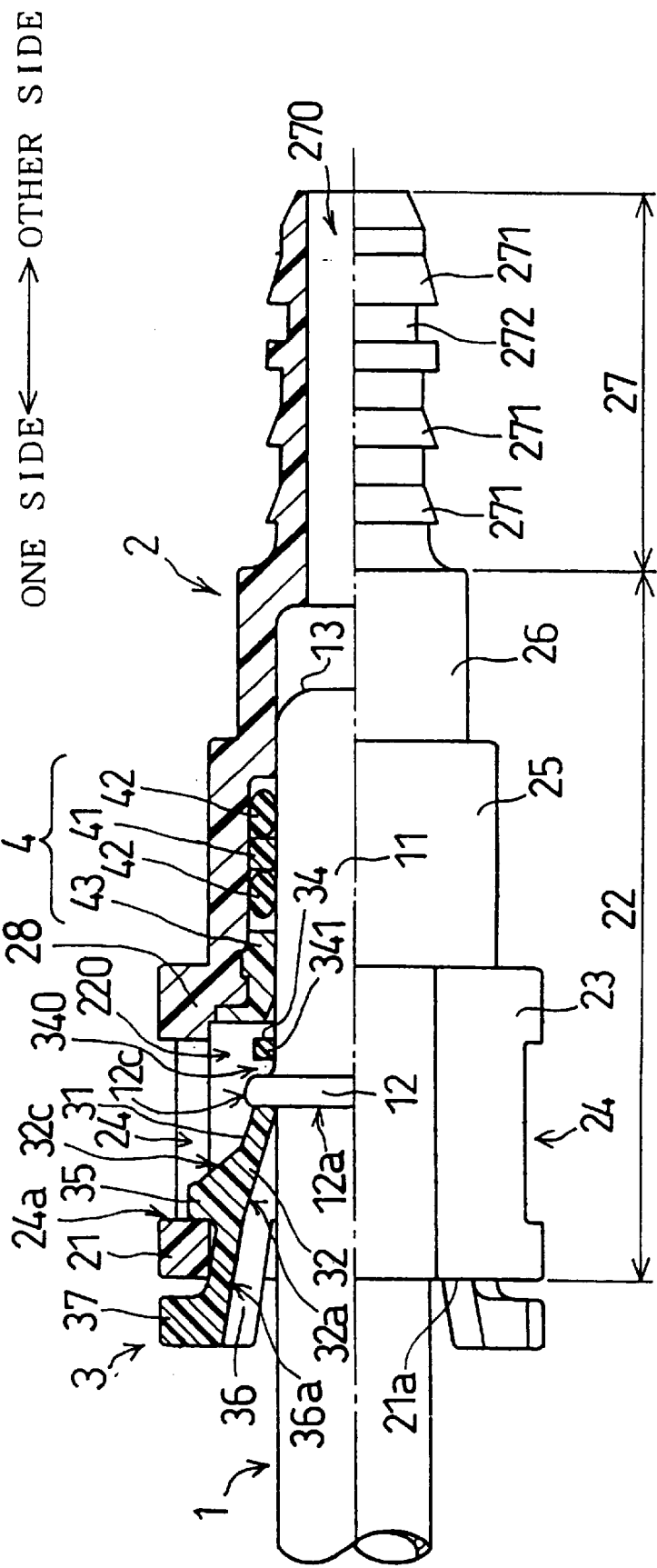
FIG. 1 is a semi-cross-sectional view for illustrating an overall arrangement of Example No. 1 of a quick connector assembly according to the present invention.

As illustrated in FIG. 1, Example No. 1 of the present quick connector assembly comprises a male member 1, a female member 2 into which the male member 1 is inserted, a retainer 3 which fastens and prevents the male member 1 from coming off from the female member 2, and sealing members 4 which seal between the male member 1 and female member 2.

First of all, the male member 1 includes a substantially-pipe-shaped insertion end portion 11 having a tip 13. The insertion end portion 11 has a ring-shaped projection 12 which is disposed away from the tip 13 by a predetermined distance and projects in centrifugal direction. The male member 1 is an integral component member made from a mild steel. The ring-shaped projection 12 is formed by plastic working. The tip 13 of the male member 1 is made by drawing so that the outer peripheral surface is rounded. Thus, the tip 13 is likely to be inserted into the female member 2. Note that the male member 1 has a rotary symmetric configuration around the axis.

Figure 2:
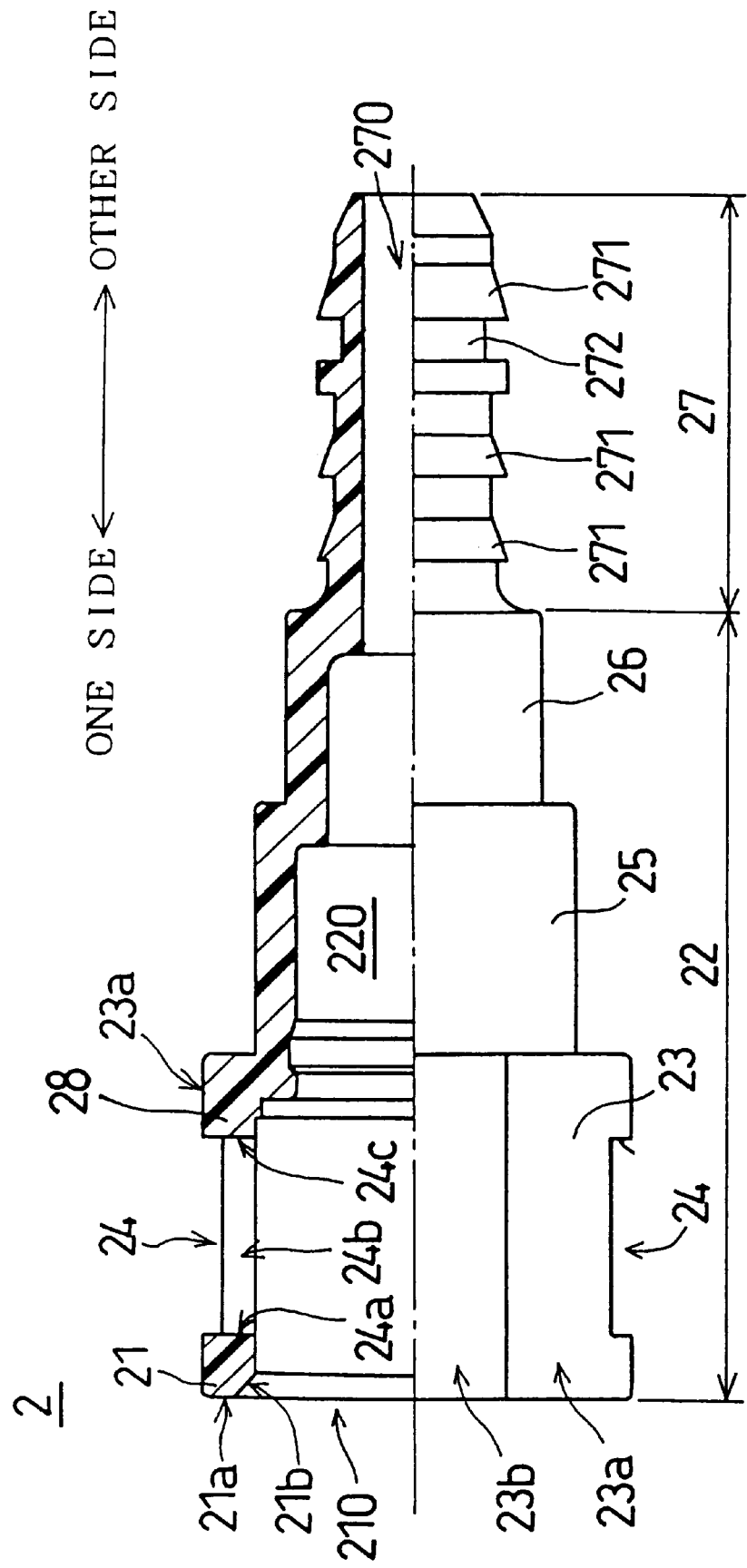
FIG. 2 is a semi-cross-sectional view for illustrating an arrangement of a female member of Example No. 1.

Then, the female member 2 is a substantially-cylinder-shaped component member, and is an integrally-molded product made from a glass-fiber-reinforced nylon resin. The insertion end portion 11 of the male member 1 is inserted into a receiving portion 22 from an insertion opening end portion 21. Specifically, as illustrated in FIG. 2, the female member 2 comprises the insertion opening end portion 21, and the hollow-and-substantially-cylinder-shaped receiving portion 22 at one end of the female member 2. The insertion opening end portion 21 is opened on one side in the axial direction. The receiving portion 22 includes first engagement portions on the peripheral wall The first engagement portions have an engagement surface 24a which faces on other side in the axial direction and extends in a radial direction. As the first engagement portions, a pair of windows 24 are formed. The windows 24 are opened in the peripheral wall of the receiving portion 22 so as to face with each other. The engagement surfaces 24a of the first engagement portions are parts of the opening inner surfaces of the windows 24. The female member 2 further includes a chamfer-like guiding tapered surface 21b on parts which correspond to the windows 24 (i.e., the first engagement portions) in the insertion opening end portion 21 as well. The chamfer-like guiding tapered surface 21b continues from an opening-end surface 21b of the insertion opening end portion 21 to the inner peripheral wall 28 of the receiving portion 22.

More specifically, the female member 2 is roughly divided into, and is composed of the aforementioned insertion opening end portion 21 and receiving portion 22, and a hose connector 27 which is inserted into and connected with a tube or hose.

The insertion opening end portion 21 includes the opening-end surface 21a, and the chamfer-like guiding tapered surface 21b. At the axial center of the insertion opening end portion 21, there is formed an insertion hole 210 into which the insertion end portion 11 of the male member 1 and the retainer 3 is inserted. The chamfer-like guiding tapered surface 21b extends from the opening-end surface 21a of the insertion opening end portion 21 to the inner peripheral wall 28 of the receiving portion 22, and is formed all around the opening-end surface 21a. Thus, the male member 1 and retainer 3 can be inserted into the receiving portion 22 easily.

The receiving portion 22 has an accommodation space 220 adapted to receive the insertion end 11, and includes a major-diameter portion 23, an intermediate-diameter portion 25, and a minor-diameter portion 26. In the major-diameter portion 23, there are formed the windows 24 working as the first engagement portions. The intermediate-diameter portion 25 accommodates sealing members 4, such as an O-ring 41, therein (shown in FIG. 1). Into the minor-diameter portion 26, the tip 13 of the male member 1 is to be inserted. As the first engagement portions, there are formed a pair of the windows 24 in the major-diameter portion 23, windows 24 which have a rectangular opening and face with each other. One of the opening inner surfaces of the windows 24 is an engagement surface 24a which faces on the other side in the axial direction and extends in the radial direction. The opening inner surfaces of the windows 24 include the engagement surface 24a, an opposing surface 24c which faces the engagement surface 24a, and a pair of opening side surfaces 24b which face with each other and form the side surfaces of the windows 24 in the peripheral direction.

Turning back to FIG. 1, the receiving portion 22 of the female member 2 includes the major-diameter portion 23, the intermediate-diameter portion 25, and the minor-diameter portion 26. The major-diameter portion 23 is a portion for accommodating the ring-shaped projection 12 of the male member 1 and a body 31 and second engagement portions 35 of the retainer 3 therein, and has not only the maximum inside diameter but also the maximum outside diameter. The intermediate-diameter portion 25 has inside and outside diameters smaller than those of the major-diameter portion 23, and is a portion for holding the ring-shaped sealing members 4 therein. The ring-shaped sealing members 4 contact with the inner peripheral surface of the intermediate-diameter portion 25 and the outer peripheral surface of the insertion end portion 11 of the male member 1. The minor-diameter portion 26 has inside and outside diameters smaller than those of the intermediate-diameter portion 25, and is a portion for accommodating the tip 13 of the male member 1 therein.

Since the tip 13 of the male member 1 is held by the minor-diameter portion 26 of the female member 2, the posture of the male member 1 is stabilized with respect to the female member 2, and accordingly there arises no shaking between the male member 1 and female member 2. Thus, Example No. 1 of the present quick connector assembly can be connected more stably. Since the ring-shaped sealing members 4 are held between the outer peripheral surface of the insertion end portion 11 of the male member 1 and the inner peripheral surface of the intermediate-diameter portion 25, there are provided high water-proof and air-proof properties between the male member 1 and female member 2. As a result, fluids, flowing in Example No. 1, can be prevented from leaking to the outside effectively. Hence, Example No. 1 can be connected more stably, and can exhibit sufficiently high water-proof and air-proof properties.

The female member 2 is will be hereinafter described more in detail. The outer peripheral surface of the major-diameter portion 23 of the female member 2 includes two outer peripheral surfaces 23a which are formed as an arc-shaped cylindrical surface disposed concentrically with the axis, and two outer side surfaces 23b which face rearward. In the outer peripheral surfaces 23a, there are formed the windows 24. The outer side surfaces 23b are a flat surface whose normal is perpendicular to the facing direction of the windows 24. The outer side surfaces 23b are disposed intentionally so that a worker naturally avoids holding the windows 24 but can hold the major-diameter portion 23 of the female member 2. Moreover, when the female member 2 is placed on a table, the outer side surfaces 23b prevent the female member 2 from rolling over.

The intermediate-diameter portion 25 includes a cylinder-shaped outer peripheral surface whose diameter is smaller than that of the major-diameter portion 23. The inner peripheral surface of the intermediate-diameter portion 25 is also formed to have an inside diameter smaller than that of the inner peripheral surface of the major-diameter portion 23. As also illustrated in FIG. 1, in an accommodation space 220 of the intermediate-diameter portion 25, two O-rings 42 are accommodated therein. A ring-shaped member 41 made from a resin is interposed between the O-rings 42. Consequently, when the first half of the insertion end portion 11 is inserted into the intermediate-diameter portion 25, water-proof and air-proof properties are produced securely between the inner peripheral surface of the intermediate-diameter portion 25 and the cylinder-shaped outer peripheral surface of the insertion end portion 11.

In the accommodation space 220 between the major-diameter portion 23 and intermediate-diameter portion 25, there is inserted and fastened a bushing 43. The inner peripheral surface between the major-diameter portion 23 and intermediate-diameter portion 25 is provided with a major-inside-diameter portion and a minor-inside-diameter portion. An outer peripheral surface of the bushing 43 engages with the inner peripheral surface so that the bushing 43 cannot be come off from the accommodation space 220 once it is fitted therein. For instance, the bushing 43 has a flange at the one-side end. The flange prevents the bushing 43 from being inserted into the female member 2 more than necessary. The bushing 43 further has other flange of a relatively small outside diameter at the intermediate portion. The other flange prevents the bushing 43 from coming off from the female member 2. Since the bushing 43 seals the accommodation space 220, the ring-shaped member 41 and O-rings 42 are prevented from coming off from the intermediate-diameter portion 25 of the female member 2. Note that the inner peripheral surface of the bushing 43 is formed like a funnel on the one-side end, funnel which expands toward the one side. Thus, the tip 13 of the male member 1 can be inserted into the intermediate-diameter portion 25 of the female member 2 with ease.

The minor-diameter portion 26 is a hollow cylinder-shaped portion which is smaller than the intermediate-diameter portion 25. Into the accommodation space 220 of the minor-diameter portion 26, the leading-end portion of the insertion end portion 11 of the male member 1, involving the tip 13, is fitted. Thus, the tip 13 fits with the minor-diameter portion 26.

Whilst, the hose connector 27 is a hollow substantially-cylinder-shaped portion, and has a fluid passage bore 270 formed at the center. The hose connector 27 includes three steps 271, and one sealing groove 272 on the outer peripheral surface. Here, the steps 271 have a portion which is tapered toward the other side, or a truncated cone-shaped outer peripheral surface. Thus, when a hose, etc., is connected with the hose connector 27, the steps 271 prevents the hose from coming off from the hose connector 27. The sealing groove 272 is a groove for holding a sealing member, such as an O-ring, therein. Thus, the sealing member is held between the sealing ring 272 and an inner peripheral surface of the hose to provide water-proof and air-proof properties therebetween.

The female member 2 is formed as a rotary symmetric configuration around the axis substantially. However, only the major-diameter portion 23 is formed as a symmetric configuration with respect to two symmetric surfaces which involve the axis and cross perpendicularly with each other.

Finally, as also illustrated in FIG. 1, the retainer 3 is an elastically-deformable integral component member made from a polyamide resin. Most of the retainer 3 is inserted into the receiving portion 22 from the insertion opening end portion 21 of the female member 2. When the retainer 3 is inserted into the receiving portion 22 of the female member 2 appropriately, the retainer 3 is interposed between the ring-shaped projection 12 of the male member 1 and the engagement surfaces 24 of the female member 2 so that the insertion end portion 11 of the male member 1, fitted from the insertion opening end portion 21 of the female member 2, is installed in the receiving portion 22 of the female member 2.

Figure 3:
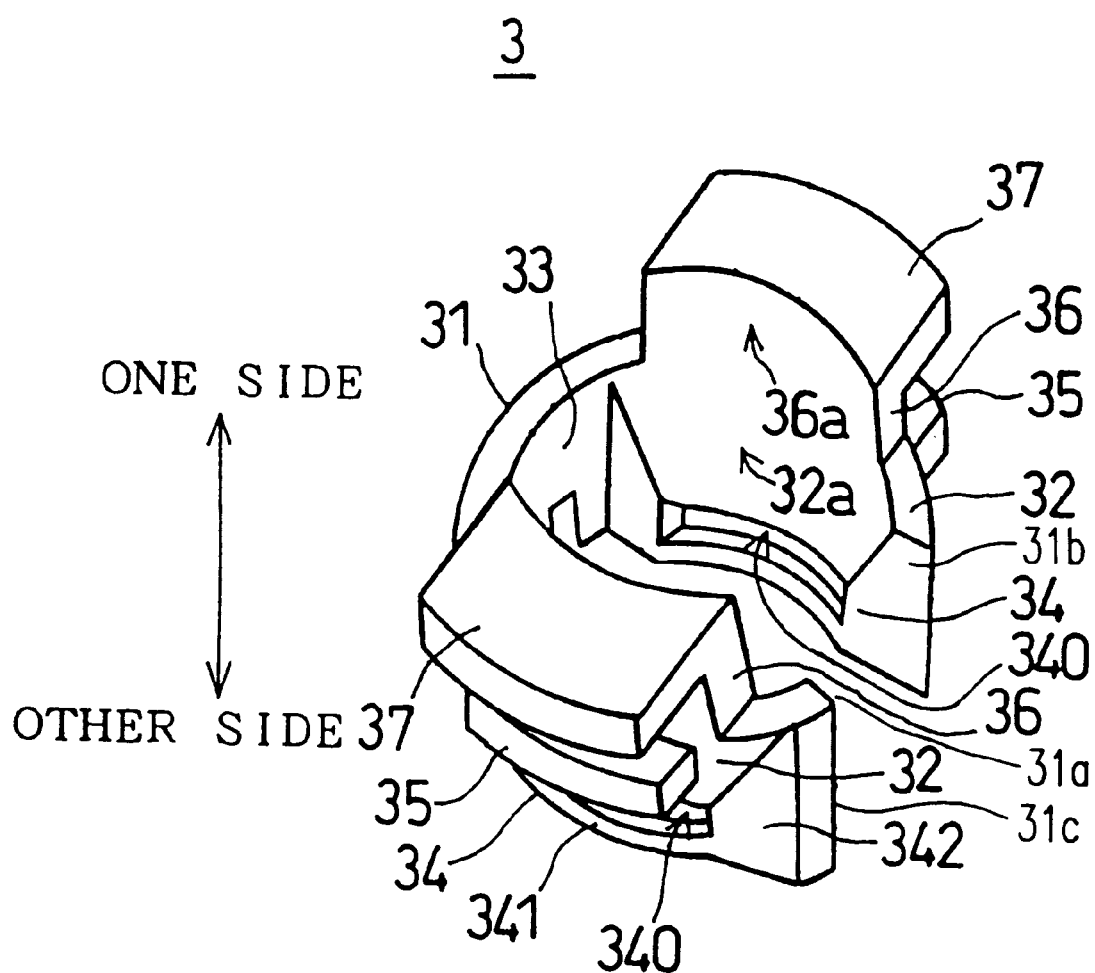
FIG. 3 is a perspective view for illustrating an arrangement of a retainer of Example No. 1.

For example, the retainer 3 includes a cross-sectionally substantially-letter-C-shaped body 31, second engagement portions 35, and a pair of operation arms 36. The body 31 can enlarge and reduce diametrically by elastic deformation. The second engagement portions 35 engage with the engagement surfaces 24a of the female member 2. The operation arms 36 are used to disconnect the present quick connector assembly. The body 31 is part of the retainer 3, part which has a tapered wall 32 and holding portions 34. The tapered wall 32 has an inner peripheral surface which reduces diametrically toward the other side. The holding portions 34 are disposed on the other-side end of the tapered wall 32, and fit with the ring-shaped projection 12 of the insertion end portion 11 of the male member 1 to hold the insertion end portion 11. The second engagement portions 35 are a pair of detents which project from the one-side end of the body 31 in centrifugal direction, and which is formed integrally with the body 31. In other words, the second engagement portions 35 are parts of the body 31, parts which engage with the windows 24 of the female member 2 working as the first engagement portions. The operation arms 36 have operation end portions 37. The operation end portions 37 project from the one-side end of the body 31 to the one side, and protrude beyond the insertion opening end portion 21 when the retainer 3 is inserted into the receiving end portion 22 of the female member 2. To put it differently, the operation end portions 37 are paired parts of the body 31 which are urged in centrifugal direction by an elastic force of the body 31, and which face rearward with each other. As shown in FIG. 3, the body 31 has a space (31a) which separates both ends (31b) and (31c) of the body 31. The length of the space between the both ends (31b) and (31c) of the body 31 is smaller than the outer diameter of the insertion end portion 11 of the male member 1 (for example, see FIG. 9).

Here, each of the holding portions 34 of the retainer 3 includes aperture windows 340 with which part of the ring-shaped projection 12 of the male member 1 fits. As illustrated in FIG. 1, the receiving portion 22 of the female member 2 includes the windows 24 in the peripheral wall, and the windows 240 are disposed at positions at which the aperture windows 340 of the retainer 3 are observed from the outside. Hence, when the ring-shaped projection 12 of the male member 1 fits with the aperture openings 340 of the retainer 3, parts of the ring-shaped projection 12 are exposed from the aperture windows 340. Thus, it is possible to visually check from the outside through the windows 24 of the female member 2 how the fitting is done.

Figure 4:
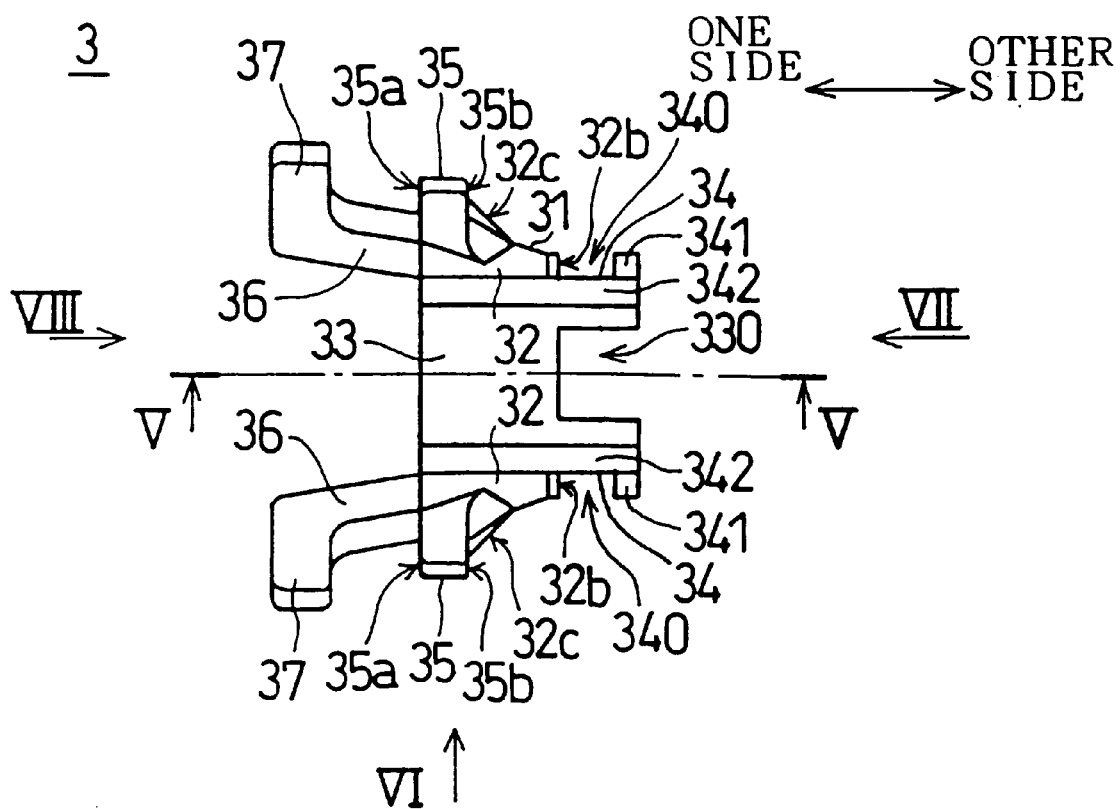
FIG. 4 is a side view for illustrating the arrangement of the retainer of Example No. 1.

As illustrated in FIG. 4, the outer side surface of the body 31 of the retainer 3 has inclined surfaces 32c which approach the axis as they develop from the second engagement portions 35 to the other side. Hence, when the retainer 3 is inserted into the female member 2, the inclined surfaces 32c of the retainer 3 contact inward with the insertion opening end portion 21 of the female member 2. Accordingly, as the retainer 3 is pushed into the female member 2, the body 31 is naturally reduced diametrically. As a result, the retainer 3 can be inserted into the female member 2 with ease.

As illustrated in FIG. 4, the body 31 of the retainer 3 has a cut-off 330 which is disposed between the holding portions 34 neighboring in the peripheral direction, and which is formed from the other side. Hence, when attaching and detaching the retainer 3 to and from the male member 1 or female member 2, not only the retainer 3 can easily enlarge and reduce diametrically, but also can easily deform asymmetrically in the axial direction. As a result, the retainer 3 can be attached and detached more easily.

The arrangement of the retainer 3 will be hereinafter described in more detail with reference to FIGS. 3 through 8.

Figure 5:
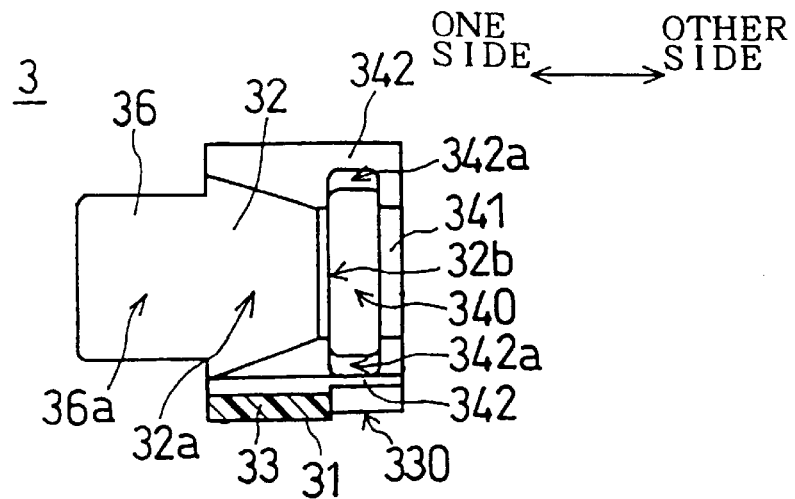
FIG. 5 is a bottom-wise cross-sectional view for illustrating the arrangement of the retainer of Example No. 1.
Figure 6:
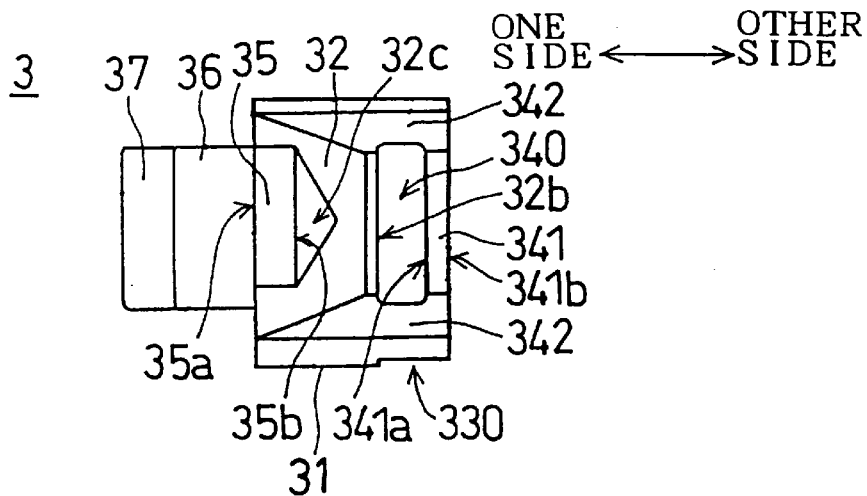
FIG. 6 is a bottom view for illustrating the arrangement of the retainer of Example No. 1.
Figure 7:
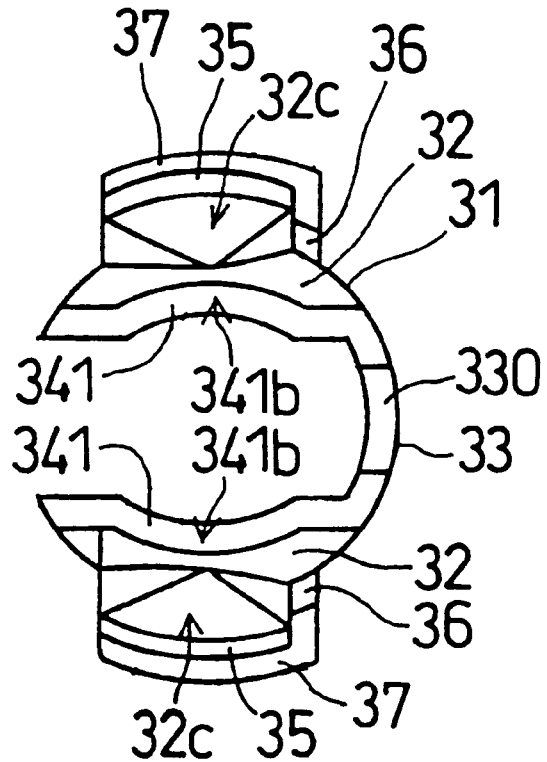
FIG. 7 is a front view for illustrating the arrangement of the retainer of Example No. 1.
Figure 8:
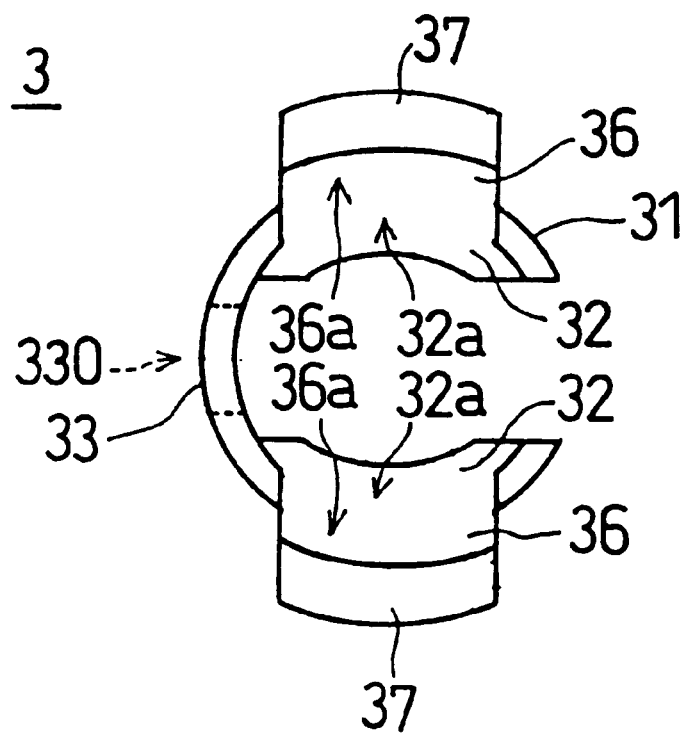
FIG. 8 is a rear view for illustrating the arrangement of the retainer of Example No. 1.

FIG. 3 is a perspective view in which the retainer 3 is viewed perspectively on the one side. FIG. 4 is a side view in which the retainer 3 is viewed in the same direction as FIG. 1 is viewed. FIG. 5 is a bottom-wise cross-sectional view in which the retainer 3 is viewed in the direction of the arrow V—V of FIG. 4. FIG. 6 is a bottom view in which the retainer 3 is viewed in the direction of the arrow VI of FIG. 4. FIG. 7 is a front view in which the retainer 3 is viewed in the direction of the arrow VII of FIG. 4. FIG. 8 is a rear view in which the retainer 3 is viewed in the direction of the arrow VIII of FIG. 4.

As illustrated in FIG. 3, the body 31 of the retainer 3 can enlarge and reduce diametrically by elastic deformation, and is a cross-sectionally substantially-letter-C-shaped portion. At the opposite ends of the cross-sectionally substantially-letter-C-shaped portion, an opening is formed between the end surfaces. An interval of the opening is designed so that it is slightly smaller than the outside diameter of the male member 1. As illustrated in FIG. 4, the body 31 includes a pair of the tapered walls 32, and a connector 33. The tapered walls 32 face with each other, and have a funnel-like inner peripheral surface 32a. The connector 33 connects the tapered walls 32. As illustrated FIGS. 3, 5 and 8, the inner peripheral surfaces 32a of the tapered walls 32 face with each other, and are formed as a funnel-like tapered surface. The funnel-like tapered surface continues from inner side surfaces 36a of the operation arms 36, and reduces the width from the one side to the other side.

As illustrated in FIGS. 1, 4, 6 and 7, the outer peripheral surface of the body 31 of the retainer 3 has the inclined surfaces 32c which are inclined to approach in the centripetal direction as they develop from the second engagement portions 35 to the other side. The inclined surfaces 32c reduce the width from the second engagement portions 35 to the other side in the peripheral direction: namely; they have a tapered shape which is tapered from wide to narrow in the direction away from the second engagement portions 35 to the other side.

The body 31 of the retainer 3 includes the pair of holding portions 34 at the other-side end of the tapered walls 32. The holding portions 34 have the pair of aperture windows 34 which face with each other. As illustrated in FIG. 4, the holding portions 34 are disposed away from each other by the letter-C-shaped opening and the cut-off 330 of the connector 33. As illustrated in FIG. 6, the holding portions 34 have a window frame 341, and supporters 342. The window frame 341 is disposed away from the tapered wall 32 by a predetermined interval, and extends in the peripheral direction. The supporters 342 extend from the tapered wall 32 to the other side, and hold the opposite ends of the window frame 341.

Each of the aperture windows 340 formed in the holding portions 34 is surrounded by the tapered wall 32, the window frame 341 and the supporters 342. The window frames 341 are disposed away from the tapered wall 32 by a predetermined interval, and extends in the peripheral direction. The supporters 342 extend from the tapered wall 32 to the other side, and hold the opposite ends of the window frames 341. Thus, the aperture windows 340 are formed between a one-side end surface 32b and an other-side end surface 341a. Note that the one-side end surface 32b is an other-side end surface of the tapered walls 32; and the other-side end surface 341a is a one-side end surface of the window frames 341.

The window frames 341 include leading end surfaces 341b (See FIG. 6.), i.e., other-side end surfaces. The leading end surfaces 341b are formed so as to be flush with each other. Moreover, as illustrated in FIG. 5, an inner peripheral surface of the supporters 342 form an inward contact surface 342a with which the outer peripheral surface 12c (See FIG. 9.) of the ring-shaped projection 12 of the male member 1 contact. Note that the dimensions of the holding portions 34 are designed so that the inward contact surfaces 342a fit with the ring-shaped projection 12 of the male member 1 with light shrink fit.

As illustrated in FIGS. 4 and 6, the second engagement portions 35 of the retainer 3 are a pair of detents which project outward from the body 31. Each of the second engagement portions 35 includes a one-side end surface 35a which faces to the one side. Turning back to FIG. 1, the one-side end surfaces 35a (See FIG. 4) contact with the engagement surfaces 24a of the windows 24 of the female member 2, and accordingly prevent the retainer 3 from coming off from the female member 2. Hence, the body 31 of the retainer 3 is formed with a size so that, under no load, the second engagement portions 35 engage with the engagement surfaces 24a of the female member 2 by a predetermined radial depth.

As illustrated in FIG. 4, the operation arms 36 project from the left side end of the body 31 towards left in this FIG. end of the body 31 to the one side. Turning back to FIG. 1, the operation arms 36 have the operation end portion 37. The operation end portions 37 protrude beyond the insertion opening end portion 21 when the retainer 3 is inserted into the receiving portion 22 of the female member 2. The operation end portions 37 are formed in a size so that the outside surface does not protrude over the major-diameter portion 23 of the female member 2 in the radial direction. Thus, when the present quick connector assembly is connected, the other components surrounding the present quick connector assembly are prevented from contacting with the operation end portions 37 inadvertently. When the retainer 3 is accommodated in the receiving portion 22 of the female member 2, the operation arms 36 are urged in the centrifugal direction by the elastic force of the body 31. Thus, as illustrated in FIG. 1, the inner side surfaces 36a of the operation arms 36 are placed away from the outer peripheral surface of the male member 1.

Turning back to FIG. 4, the configuration of the retainer 3 is plane-symmetric with respect to the V—V plane.

(Operations and Advantages of Example No. 1)

Example No. 1 of the present quick connector assembly acts in two ways, connection and disconnection. First, Example No. 1 can be connected in both of the following two procedures.

Figure 9:
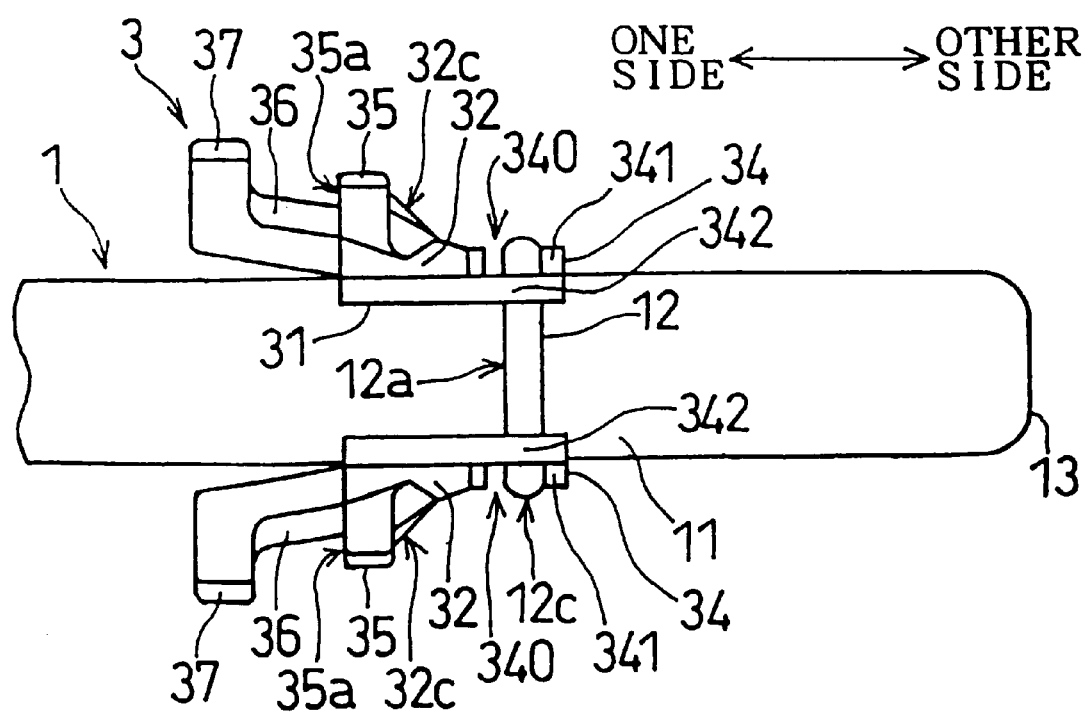
FIG. 9 is a side view for illustrating how the male member and the retainer of Example No. 1 are engaged.

The first connecting procedure is carried out as follows. As illustrated in FIG. 9, the insertion end portion 11 of the male member 1 is held by the holding portions 34 of the retainer 3, and the male member 1 is sub-assembled with the retainer 3. For instance, the first connecting procedure is carried out while the ring-shaped projection 12 of the male member 1 fits with aperture windows 340 of the retainer 3. In the sub-assembled state, the insertion end portion 11 of the male member 1 is inserted into the receiving portion 22 of the female member 2 together with the retainer 3, thereby engaging the second engagement portions 35 of the retainer 3 with the engagement surfaces 24a of the windows 24 of the female member 2.

In the first connecting procedure, when holding the insertion end portion 11 of the male member 1 with the retainer 3, the tip 13 of the male member 1 is first inserted into the retainer 3 from the one-side end of the retainer 3 while roughly aligning the axes of the male member 1 and retainer 3. Even if a worker tries to fit the male member 1 into the retainer 3 while slightly displacing the axes of the male member 1 and retainer 3, the displaced axes can be corrected naturally because the inner side surfaces 36a of the operation arms 36 contact with the insertion end portion 11 of the male member 1.

Then, the outer peripheral surface 12c of the ring-shaped projection 12, disposed on the insertion end portion 11 of the male member 1, contacts with the inner peripheral surfaces 32a (See FIG. 3.) of the tapered walls 32 of the retainer 3. While the ring-shaped projection 12 expands the cross-sectionally substantially-letter-C-shaped body 31 of the retainer 3, the male member 1 is inserted into the body 31 toward the other side of the body 31. When the male member 1 is further fitted deep into the retainer 3, and when the ring-shaped projection 12 of the male member 1 reaches the holding portions 34 of the retainer 3, the ring-shaped projection 12 fits with the aperture windows 340 of the holding portions 34 naturally. As a result, as also illustrated in FIG. 9, the insertion end portion 11 of the male member 1 is held by the holding portions 34 of the retainer 3. Thus, the male member 1 and retainer 3 are assembled.

Thereafter, the engagement surfaces 24a of the windows 24 of the female member 2 and the second engagement portions 35 of the retainer 3 are positioned in the same peripheral direction. The insertion end portion 11 of the male member 1 is fitted from the insertion opening end portion 21 of the female member 2 into the receiving portion 22 together with the retainer 3. As a result, when the insertion end portion 11 is inserted into the receiving portion 22 by a predetermined insertion depth, as best shown in FIG. 1, the second engagement portions 35 of the retainer 3 are enlarged outward by the elastic force of the cross-sectionally substantially-letter-C-shaped body 31 of the retainer 3, and engage with the windows 24 of the female member 2.

Specifically, the one-side end surfaces 35a (See FIG. 4.) of the second engagement portions 35 of the retainer 3 face the engagement surfaces 24a of the windows 24 of the female member 2. Then, the one-side end surfaces 35a contact with the engagement surfaces 24a so that the retainer 3 does not come off from the female member 2. As a result, the body 31 and second engagement portions 35 of the retainer 3 are interposed between the one-side end surface 12a of the ring-shaped projection 12 of the male member 1 and the engagement surfaces 24a of the windows 24 of the female member 2. Accordingly, even when somebody tries to pull off the male member 1 from the female member 2, the male member 1 cannot be pulled off from the female member 2. Thus, the connection between the male member 1 and female member 2 is completed. Note that the one-side end surface 32b is placed at the minor diameter end of the body 31 and the one-side end surfaces 35a are placed at the major-diameter end of the body 31.

The second connecting procedure is carried out as follows. The retainer 3 is first inserted into the receiving portion 22 of the female member 2. The second engagement portions 35 of the retainer 3 are engaged with the windows 24 of the female member 2 to hold the retainer 3 in the receiving portion 22 of the female member 2. Then, the insertion end portion 11 of the male member 1 is inserted into the receiving portion 22 of the female member 2 and the retainer 3.

In the second connecting procedure, the windows 24 (i.e., the first engagement portions) of the female member 2 and the second engagement portions 35 of the retainer 3 are first positioned in the peripheral direction. Then, the retainer 3 is inserted into the receiving portion 22 of the female member 2 from the insertion opening end portion 21. In the meantime, the ends of the second engagement portions 35 of the retainer 3 slidably contact with the chamfer-like guiding tapered surface 21b of the insertion opening end portion 21 of the female member 2. As the retainer 3 is inserted into the female member 2, the retainer reduces diametrically of itself Finally, the retainer 3 is accommodated in the receiving portion 22 of the female member 2.

When the retainer 3 is inserted into the receiving portion 22 by a predetermined insertion depth, the second engagement portions 35 of the retainer 3 are urged by the elastic force of the body 31 in the diametrically-enlarging direction to displace outward. Thus, the second engagement portions 35 engage with the windows 24 of the female member 2. As a result, as best shown in FIG. 1, the retainer 3 is held in the receiving portion 22 of the female member 2 so that it is prevented from coming off from the receiving portion 22 of the female member 2. Here, the operation end portions 37 of the operation arms 36 of the retainer 3 are kept being protruded beyond the insertion opening end portion 21 of the female member 2 toward the one side.

Thereafter, the tip 13 of the male member 1 is first inserted into the retainer 3 from the one-side end of the female member 2 and retainer 3 while aligning the axes of the male member 1 with the female member 2. In the meantime, the insertion end portion 11 of the male member 1 is inserted into the retainer 3 while the inner side surfaces 36a of the operation arms 36 of the retainer 3 slidably contact with the ring-shaped projection 12 of the male member 1 to guide the male member 1. Since the inner side surfaces 36a of the operation arms 36 of the retainer 3 continue to the inner peripheral surfaces 32a of the tapered walls 32, the ring-shaped projection 12 of the male member 1 is further inserted into the body 31 of the retainer 3 smoothly.

As a result, the outer peripheral surface 12c of the ring-shaped projection 12, disposed on the insertion end portion 11 of the male member 1, contacts with the inner peripheral surfaces 32a of the tapered walls 32 of the retainer 3. While the ring-shaped projection 12 expands the cross-sectionally substantially-letter-C-shaped body 31 of the retainer 3, the male member 1 is inserted into the body 31 toward the other-side end. In the meantime, since the body 31 of the retainer 3 is enlarged diametrically by the ring-shaped projection 12 of the male member 1, the elastic force of the retainer 3 acts in the diametrically-reducing direction.

Further, when the male member 1 is fitted deep into the retainer 3 till the ring-shaped projection 12 of the male member 1 reaches the holding portions 34 of the retainer 3, the ring-shaped projection 12 fits with the aperture windows 340 of the holding portions 34 naturally. Specifically, the interval between the holding portions 34 facing with each other is reduced by the elastic force of the body 31 of the retainer 3, and the ring-shaped projection 12 fits in the aperture windows 340. Thus, the insertion end portion 11 of the male member 1 is held by the holding portions 34 of the retainer 3.

Then, as best shown in FIG. 1, the body 31 and second engagement portions 35 of the retainer 3 are interposed between the ring-shaped projection 12 of the male member 1 and the engagement surfaces 24a of the windows 24 of the female member 2. As a result, without operating the operation arms 36, the male member 1 cannot be pulled off from the female member 2. Thus, the connection between the male member 1 and female member 2 is completed.

For instance, when an external force acts so as to pull the male member 1 off from the female member 2, the one-side end surfaces 35a of the second engagement portions 35 of the retainer 3 contact with the engagement surfaces 24a of the windows 24 of the female member 2. Accordingly, the body 31 and second engagement portions 35 of the retainer 3 are interposed between the one-side end surface 12a of the ring-shaped projection 12 of the male member 1 and the engagement surfaces 24a of the windows 24 of the female member 2 so as to resist the compression stress. Since the body 31 and second engagement portions 35 of the retainer 3 are formed with a sufficient strength, they can withstand the compression stress without fracture or buckling. As a result, even when a worker tries to pull the male member 1 off from the female member 2, the male member 1 cannot be come off from the female member 2 until the worker operates the operation arms 36. Thus, the male member 1 and female member 2 are fastened together firmly.

On the other hand, when an external force acts so as to push the male member 1 further into the female member 2, as can be appreciated from FIG. 1, the window frames 341 of the holding portions 34 are interposed between the bushing 43 and the ring-shaped projection 12 of the male member 1. The bushing 43 is fitted with and fastened to the female member 2. Hence, the pressing force applied to the male member 1 is transferred to the bushing 43 held within the female member 2 by way of the window frames 341 of the holding portions 34. Since the bushing 43 is firmly fastened to the female member 2, and since the window frames 34 of the holding portions 34 can resist the pressing force adequately, Example No. 1 of the present quick connector assembly can withstand the external force which tries to push the male member 1 into the female member 2.

Under the aforementioned circumstances, the operation end portions 37 of the retainer 3 are disposed so that they do not contact with the insertion opening end portion 21 of the female member 2 while applying a pressing force thereto. Hence, no external force is transferred to the other parts of the retainer 3, and accordingly no stress arises therein. Thus, the retainer 3 is prevented from being broken by a pushing external force.

As a result, Example No. 1 of the present quick connector assembly can be connected extremely easily, but can be connected firmly. Since the retainer 3 is held onto the female member 2 or male member 1 before the connection, the retainer 3 is prevented from falling down on actual manufacturing sites. In addition, when one of the male member 1 and female member 2 is fastened, a worker can carry out both of the first and second connecting procedures of Example No. 1 with one hand.

When the ring-shaped projection 12 of the male member 1 fits with the aperture windows 340 of the retainer 3, the retainer 3 reduces diametrically rapidly by the elastic force. Accordingly, there arises a snapping sound and a response to the fitting. Similarly, when the second engagement portions 35 of the retainer 3 fit with the windows 24, working as the first engagement portions, of the female member 2, the retainer 3 enlarges diametrically rapidly by the elastic force. Accordingly, there also arises a snapping sound and a response to the fitting. In addition, it is possible to visually check clearly through the windows 24 of the female member 2 that the second engagement portions 35 of the retainer 3 fit with the windows 24, and that the ring-shaped projection 12 of the male member 1 fits with the aperture windows 34 of the retainer 3. When connecting Example No. 1 of the present quick connector assembly, the worker naturally holds the flat outer side surfaces 23b of the major-diameter portion 23 of the female member 2 with his or her fingers, and accordingly he or she can carry out the visual checking with ease. Hence, in Example No. 1, the male member 1 and female member 2 can be connected more reliably.

As illustrated in FIG. 1, two O-rings 42 are disposed so that they contact with the inner peripheral surface of the intermediate-diameter portion 25 of the receiving portion 22 of the female member 2, and so that they hold the ring member 41 therebetween. The two O-rings 42 are interposed between the cylinder-shaped outer peripheral surface of the insertion end portion 11 of the male member 1 and the inner peripheral surface of the female member 2, and operate to keep air-proof and water-proof properties between the male member 1 and female member 2.

Whilst, Example No. 1 of the present quick connector assembly is disconnected and disassembled in the following manner.

As illustrated in FIG. 1, the retainer 3 includes the cross-sectionally substantially-letter-C-shaped body 31, the second engagement portions 35, and the operation arms 36. The body 31 has the tapered walls 32 and the holding portions 34, and can deform elastically. The second engagement portions 35 engage with the windows 24 of the female member 2. The operation arms 36 have the operation end portions 37 which protrude beyond the female member 2. Even when the retainer 3 is inserted into the receiving portion 22 of the female member 2, the operation arms 36 are separated from the outer peripheral surface of the male member 1 because the operation arms 36 are urged outward by the elastic force of the body 31. Likewise, the tapered walls 32 of the body 31 are separated from the outer peripheral surface of the male member 1. Hence, when the operation end portions 37 of the operation arms 36 are pressed and contracted with fingers in the centripetal direction, the tapered walls 32 of the body 31 are also reduced diametrically in the centripetal direction. As the tapered walls 32 are reduced diametrically, the second engagement portions 35 are disengaged from the engagement surfaces 24a of the female member 2 in the centripetal direction. Accordingly, the male member 1 and retainer 3 can be removed from the female member 2 by pulling off the male member 1.

Meanwhile, the ring-shaped projection 12 of the male member 1 fits with the holding portions 34 of the retainer 3. Consequently, as best shown in FIG. 9, the retainer 3 engages with the insertion end portion 11 of the male member 1, and keeps the integrally assembled state with the male member 1. Hence, even when the male member 1 and retainer 3 are pulled off from the female member 2, the retainer 3 does not fall off from the male member 1 inadvertently.

In order to remove the retainer 3 from the male member 1 by disassembling the male member 1 and retainer 3, the retainer 3 can be pulled outward in a direction perpendicular to the axial direction so that the insertion end portion 11 of the male member 1 comes out of the opening of the cross-sectionally substantially-letter-C-shaped body 31 of the retainer 3. In the meantime, the letter-C-shaped cross-section of the body 31 can be enlarged only to such an extent that the body 31 of the retainer 3 is enlarged diametrically so as to allow the ring-shaped projection 12 of the male member 1 to pass through the opening of the cross-sectionally substantially-letter-C-shaped body 31. Thus, the retainer 3 is prevented from deforming greatly. Hence, even when the retainer 3 is removed from the male member 1, the inconvenience, such as the fractures of the body 31 resulting from the large deformation, can be avoided. Moreover, the worker can remove the retainer 3 from the male member 1 with one hand. Therefore, it is extremely easy to remove the retainer 3 from the male member 1. As a result, the retainer 3 can be separated from the male member 1 as well as from the female member 2 without being damaged. Thus, the retainer 3 can be used repeatedly a number of times. Moreover, not to mention, not only the retainer 3, but also the male member 1 and female member 2 can be reused.

Therefore, Example No. 1 ofthe present quick connector assembly produces the following advantages. Not only it is easy to reuse the retainer 3, but also it is easy to disconnect and disassemble Example No. 1 without employing a jig, such as a releasing jig, etc. Moreover, as earlier mentioned, Example No. 1 is advantageous in that it can be connected reliably and easily.

Example No. 2
(Arrangement of Example No. 2)

Figure 10:
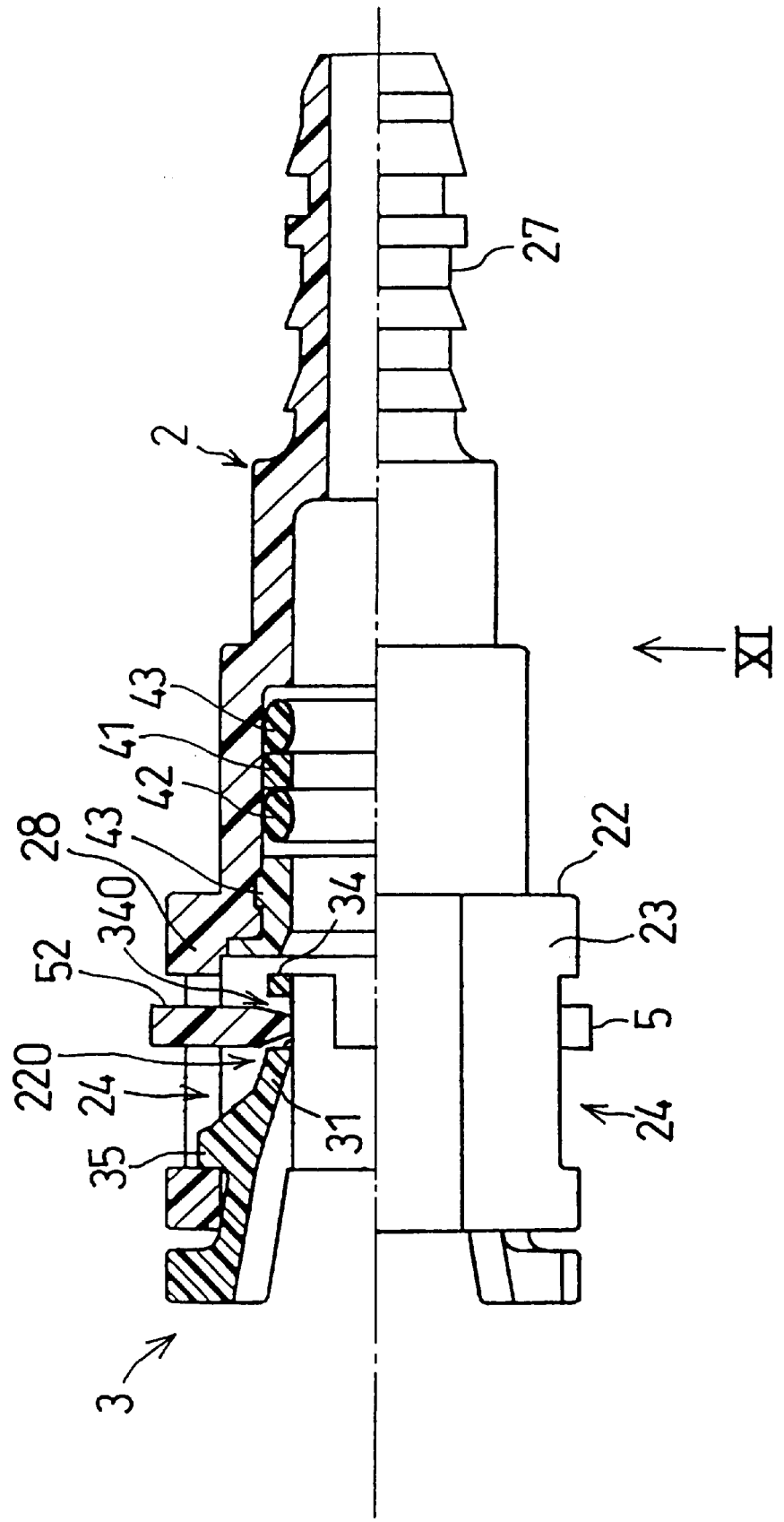
FIG. 10 is a semi-cross-sectional view for illustrating a female member, a retainer and a checking member of Example No. 2.
Figure 11:
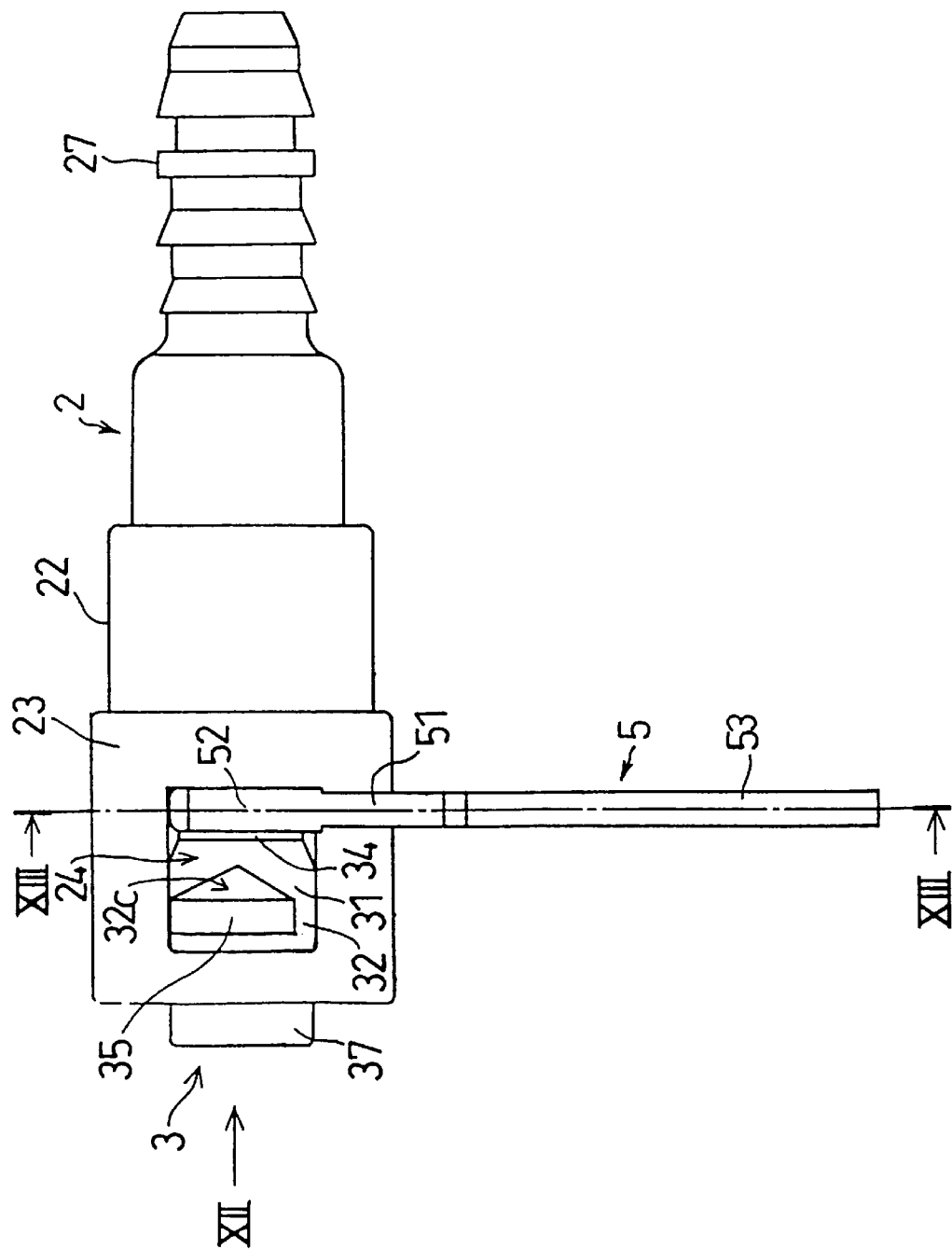
FIG. 11 is a side view for illustrating how the checking member of Example No. 2 is engaged.
Figure 12:
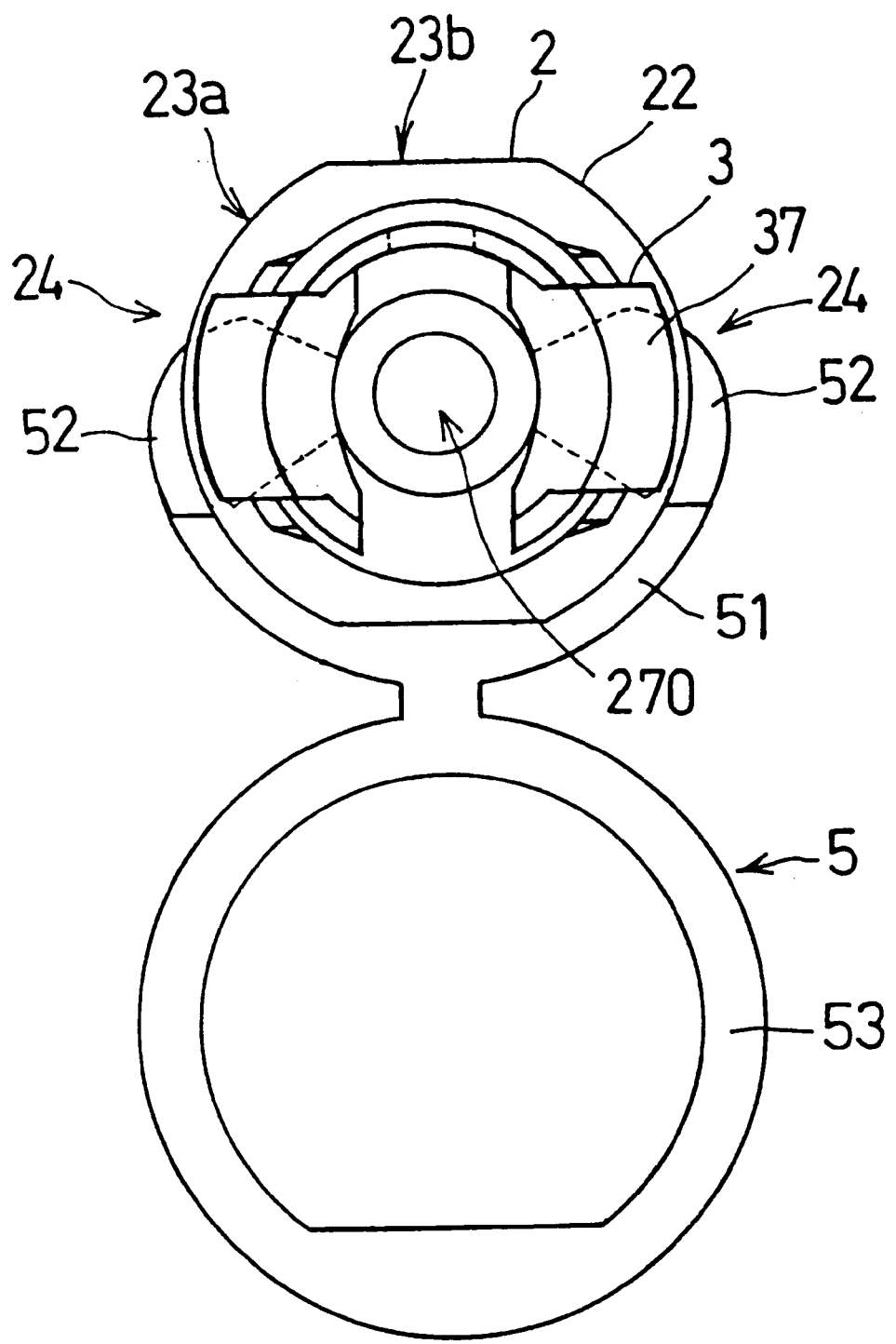
FIG. 12 is a rear view for illustrating how the checking member of Example No. 2 is engaged.

As illustrated in FIGS. 10, 11 and 12, except that a checking member 5 is added when the male member 1 is not inserted into the female member 2, Example No. 2 of the present quick connector assembly has the same arrangements as those of Example No. 1. Hence, Example No. 2 will be hereinafter described while putting emphasis on the descriptions of the arrangements, operations and advantages of the checking member 5.

Figure 13:
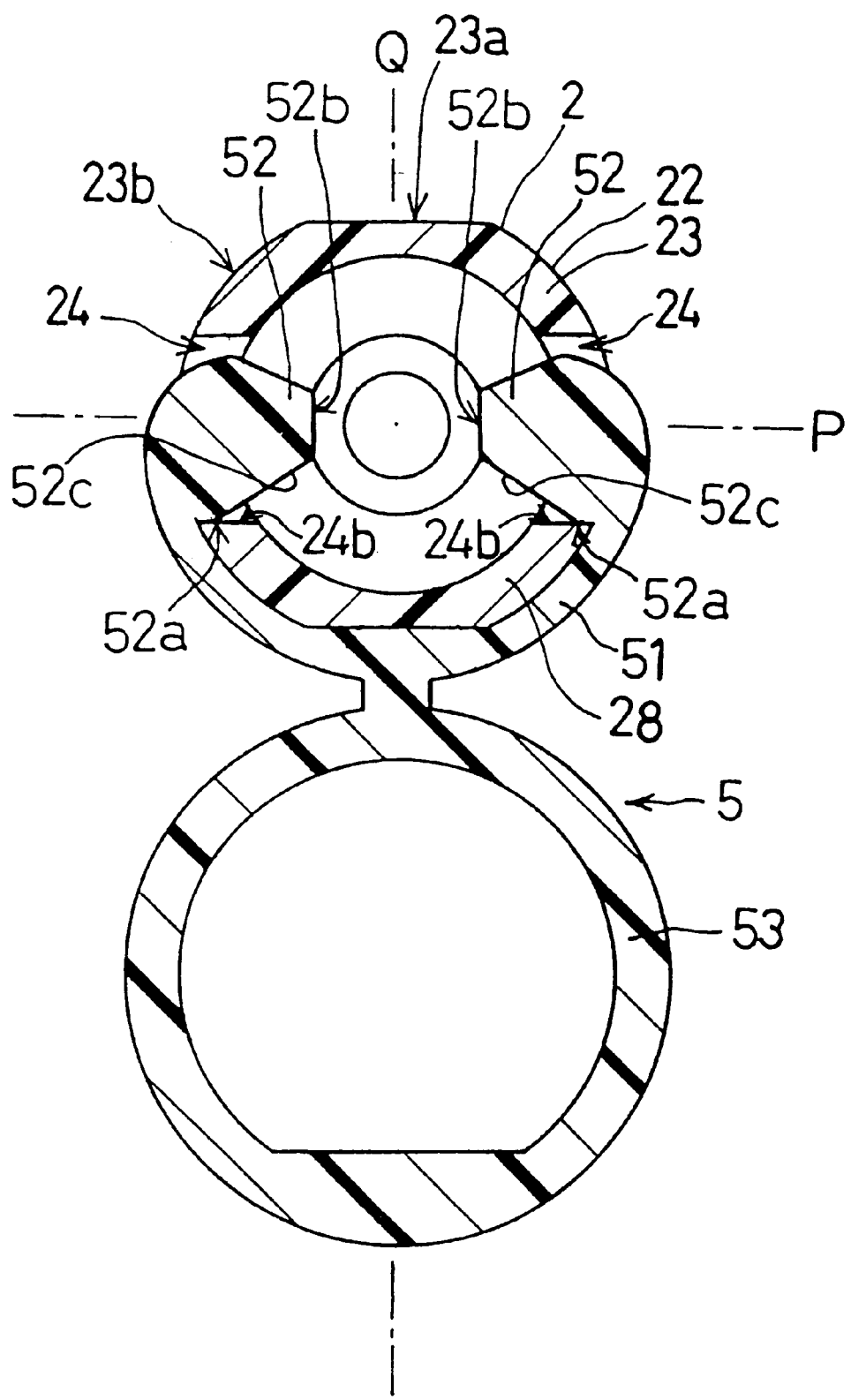
FIG. 13 is a cross-sectional view for illustrating how the checking member of Example No. 2 is engaged.

FIG. 13 illustrates the checking member 5 along with the female member 2. As illustrated in the drawing, the checking member 5 includes a letter-C-shaped portion 51, a pair of engagement projections 52 and a knob 53, and is an integrally-molded product made from a resin. The letter-C-shaped portion 51 is installed to the receiving portion 22 from the outer-peripheral side of the receiving portion 22 of the female member 2, and can enlarge and reduce diametrically by elastic deformation. The pair of engagement projections 52 project from the opposite ends of the letter-C-shaped portion 51 in a radial direction inward, and are inserted into the aperture windows 340 (See FIG. 4.) of the holding portions 34 of the retainer 3 by way of the windows 24 of the receiving portion 22 of the female member 2. The knob 53 is connected with the middle of the letter-C-shaped portion 51, and is formed as a ring shape.

When the connection between the male member 1 and female member 2 is completed, the checking member 5 operates as follows. The engagement projections 52 are pushed out in a centripetal direction by the outer peripheral surface 12c of the ring-shaped projection 12 of the male member 1 by way of the aperture windows 340 of the retainer 3. Consequently, the letter-C-shaped portion 51 is enlarged diametrically.

Note that, as illustrated in FIG. 13, the checking member 5 is formed as a symmetric configuration with respect to the second symmetric plane "Q". Accordingly, the checking member 5 can engage with the female member 2 and retainer 3 in both of the directions with respect to the first symmetric plane "P".

The arrangements of the checking member 5 will be hereinafter described more specifically with reference to FIG. 13 again. The letter-C-shaped portion 51 snugly engages with the outer peripheral surface 23a and outer side surfaces 23b of the major-diameter portion 23 of the female member 2, and fits the pair of engagement projections 52 into the receiving portion 22 by way of the windows 24 of the female member 2 by the elastic force which is inherent to the resin. Each of the engagement projections 52 has an engagement surface 52a, a leading end surface 52b, and a sliding surface 52c, respectively. The engagement surfaces 52a form cut-offs between the letter-C-shaped portion 51 and the pair of engagement projections 52. When the male member 1 is not inserted into the female member 2, the engagement surfaces 52a engage with the opening side surfaces 24b ofthe windows 24 of the female member 2. Hence, even when the worker hooks his or her finger with the knob 53 and tries to pull off the checking member 5 from the female member 2, the checking member 5 is not come off from the female member 2 because the engagement surfaces 52a engage with the opening side surfaces 24b of the windows 24 so that the letter-C-shaped portion 51 does not enlarge diametrically.

Figure 14:
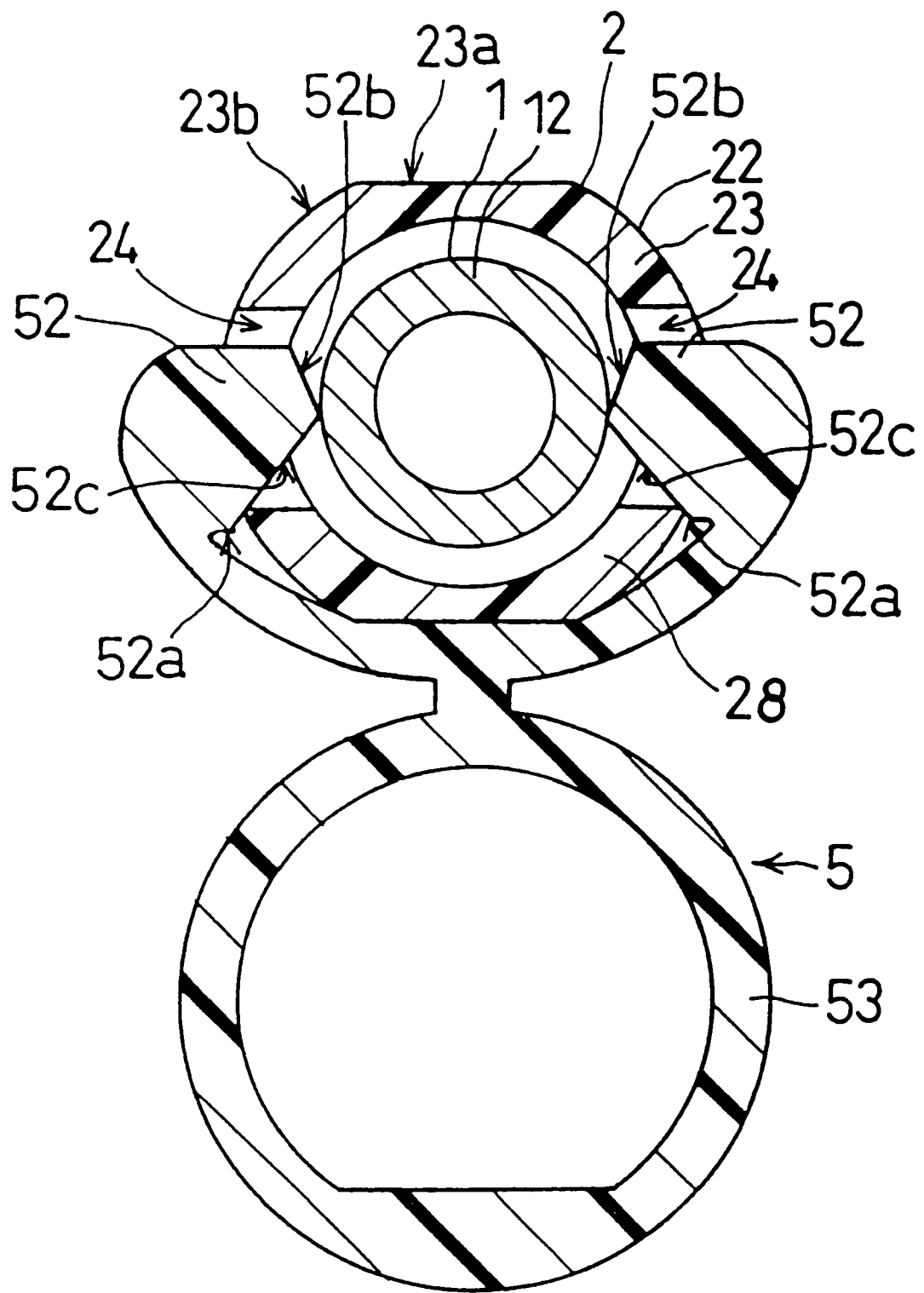
FIG. 14 is a cross-sectional view for illustrating how the checking member of Example No. 2 is enlarged diametrically.

As illustrated in FIG. 14, when the ring-shaped projection 12 of the male member 1 is inserted into the female member 2 and retainer 3 appropriately, the leading end surfaces 52b contact with the ring-shaped projection 12 at their parts at least, and are pressure application points for expanding the interval between the pair of engagement projections 52. When the intervals between the pair of engagement projections 52 are expanded to enlarge the letter-C-shaped portion 51 diametrically, the engagement surfaces 52a are separated from the windows 24 of the female member 2. Under the circumstances, the edges of the windows 24 contact with the sliding surfaces 52c. Hence, when the worker hooks his or her finger with the knob 53 and tries to pull off the checking member 5 from the female member 2, the letter-C-shaped portion 51 is enlarged diametrically increasingly while the sliding surfaces 52c contact slidably with the edges of the windows 24 of the female member 2. Finally, the checking member 5 is come off from the female member 2.

(Operations and Advantages of Example No. 2)

Turning back to FIG. 10, when the retainer 3 is inserted into the female member 2, and when the windows 24 and second engagement portions 35 are engaged with each other, the pair of engagement projections 52 of the checking member 5 are inserted into the aperture windows 340 of the retainer 3 by way of the windows 24 of the female member 2. Under the circumstances, as best shown in FIG. 13, the checking member 5 engages with the windows 24 of the female member 2 at the engagement surfaces 52a. Thus, even when the checking member 5 is pulled in the centripetal direction, the checking member 5 is not come off from the female member 2.

However, when the insertion end portion 11 of the male member 1 is inserted into the female member 2 and retainer 3 appropriately, and when the ring-shaped projection 12 of the male member 1 fits with the aperture windows 340 of the retainer 3, different situations arise. For example, as best shown in FIG. 14, the outer peripheral surface 12c (See FIG. 9) of the ring-shaped projection 12 contacts with the leading end surfaces 52b ofthe engagement projections 52 of the checking member 5, and pushes the facing engagement projections 52 outward. As a result, the letter-C-shaped portion 51 of the checking member 5 is enlarged diametrically. Accordingly, the engagement surfaces 52a of the checking member 5 are disengaged from the windows 24 of the female member 2, and the sliding surfaces 52c of the checking member 5 contact slidably with the edges of the windows 24. Consequently, the letter-C-shaped portion 51 of the checking member 5 is disengaged from the windows 24 of the female member 2. As a result, when the checking member 5 is pulled in the centripetal direction, the letter-C-shaped portion 51 is enlarged diametrically increasingly while the sliding surfaces 52c contact slidably with the edges of the windows 24 of the female member 2. Thus, the checking member 5 can come off from the female member 2.

Therefore, after fitting the male member 1 into the female member 2 and retainer 3 to connect Example No. 2 of the present quick connector assembly, the worker can know the following situations by simply hooking his or her finger with the knob 53 and pulling the checking member 5. When the worker pulls the checking member 5, and when the pulling operation results in the removal of the checking member 5 from the female member 2, the worker can confirm that Example No. 2 is connected appropriately without carrying out a visual inspection. Thus, even when the operations should be carried out by groping deep inside facilities, Example No. 2 can be justified that it is connected appropriately without carrying out a visual inspection.

As a result, Example No. 2 of the present quick connector assembly produces an advantage in that the reliability can be upgraded even when it is connected by groping. Moreover, the checking member 5 is not removed from the female member 2 until the worker hooks his or her finger with the knob 53 and pulls the checking member 5. Thus, the checking member 5 does not come off from the female member 2 of itself. Hence, the worker hardly drops and loses the checking member 5.

First Modified Version of Example No. 2

Example No. 2 of the present quick connector assembly can be modified so that the checking member 5 further includes an intermediate portion between the letter-C-shaped portion 51 and knob 53, intermediate portion which engages with the major-diameter portion 23 of the female member 2. In the First Modified Version, even when the worker twists the knob 53, the intermediate portion engages with the female member 2 to withstand the twisting. Accordingly, the letter-C-shaped portion 51 is little enlarged diametrically by the twisting. Hence, unless the present quick connector assembly is connected appropriately, the checking member 5 cannot be removed from the female member 2 by inappropriate operations carried out by the worker. Therefore, the First Modified Version produces an advantage in that the present quick connector assembly can be connected more reliably.

Second Modified Version of Example No. 2

Example No. 2 of the present quick connector assembly can be modified so that the checking member 5 includes the ring-shaped knob 53 which has a cut-off partially. In the Second Modified Version, when the male member 1 is not fitted with the female member 2 and retainer 3 appropriately, and when the worker pulls out the checking member 5 from the female member 2 forcibly, part of the knob 53 fractures starting at the cut-off. Hence, unless the present quick connector assembly is connected appropriately, the checking member 5 cannot be removed from the female member 2 by inappropriate operations carried out by the worker. Therefore, the Second Modified Version produces an advantage in that the present quick connector assembly can be connected more reliably.

Example No. 3
(Arrangement of Example No. 3)

Figure 15:
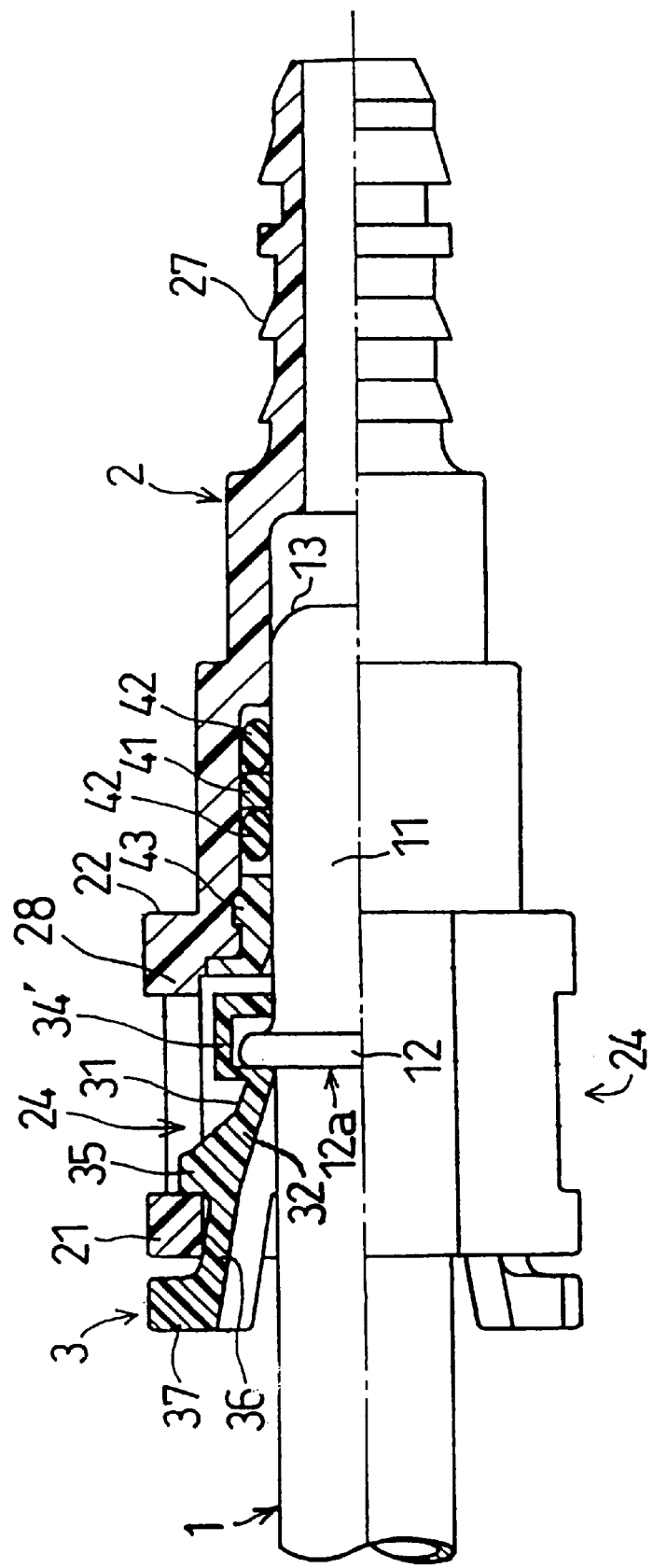
FIG. 15 is a semi-cross-sectional view for illustrating an overall arrangement of Example No. 3 of a quick connector assembly according to the present invention.

As illustrated in FIG. 15, except that the arrangements of holding portions 34' of the retainer 3 differs from that of Example No. 1, Example No. 3 of the present quick connector assembly comprises the same male member 1 and female member 2 as those of Example No. 1.

Figure 16:
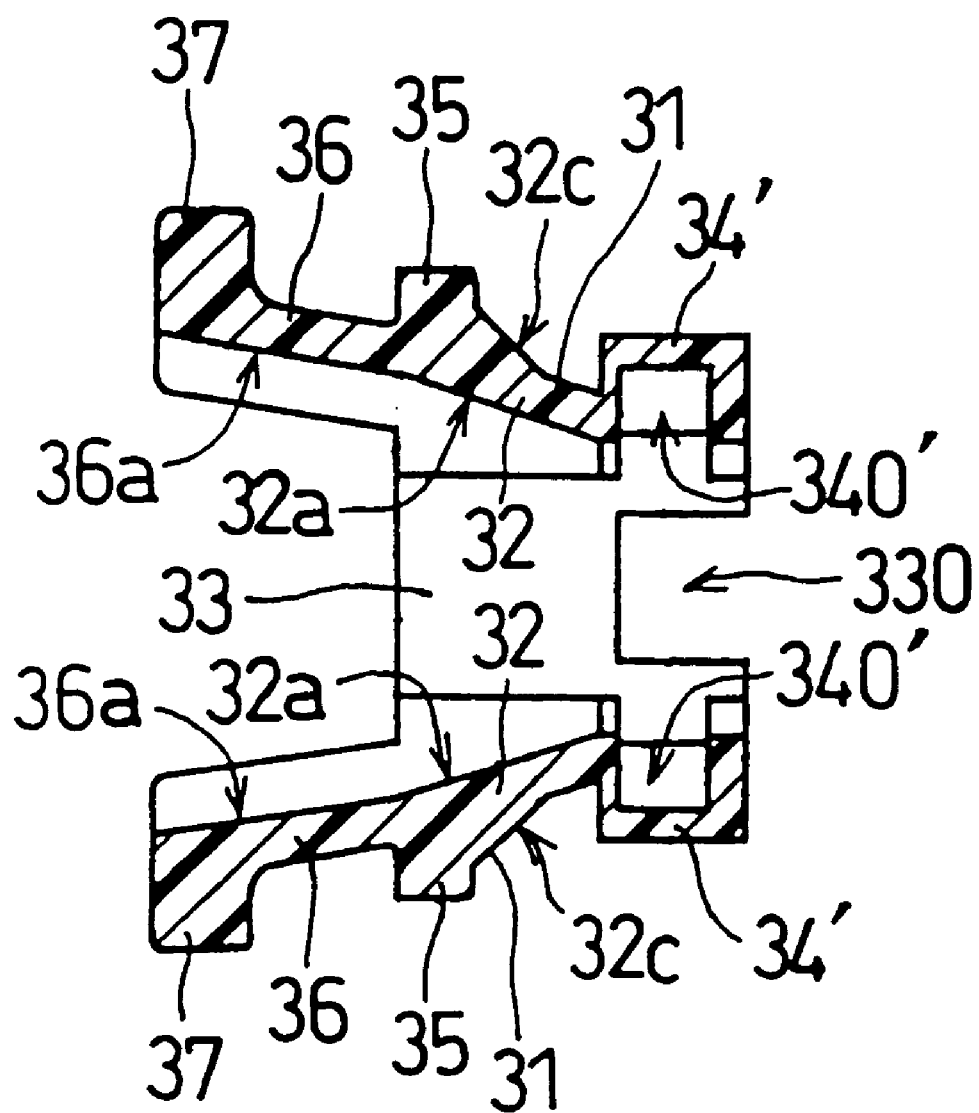
FIG. 16 is a semi-cross-sectional view for illustrating an arrangement of a retainer of Example No. 3.

In Example No. 1, the aperture windows 340 are formed in the pair of holding portions 34 of the retainer 3, holding portions 34 which face with each other. Whilst, as illustrated in FIG. 16, in Example No. 3, grooves 340' are formed in a pair of holding portions 34' which face with each other. The grooves 340' are opened inward facing with each other. Turning back to FIG. 15, the ring-shaped projection 12 of the male member 1 fits with the grooves 340 of the holding portions 34'. Thus, the male member 1 is fastened to the female member 2 by the retainer 3.

(Operations and Advantages of Example No. 3)

Example No. 3 of the present quick connector assembly operates and produces advantages in the same manner as Example No. 1 substantially.

A minor difference can be pointed out in that the retainer 3 of Example No. 1 is sturdier than that of Example No. 1 because the holding portions 34' are enhanced in strength.

On the contrary, the retainer 3 of Example No. 1 is superior to that of Example No. 3 in many respects. For example, in Example No. 1, it is possible to directly check visually through the windows 24 of the receiving portion 22 of the female member 2 that the ring-shaped projection 12 of the male member 1 fits with the aperture openings 340 of the retainer 3. Moreover, as described in Example No. 2, the retainer 3 of Example No. 1 can be combined and used with the checking member 5. In addition, in view of parting molds for resinous injection molding, the retainer 3 of Example No. 1 can be manufactured more easily than that of Example No. 3.

Example No. 4
(Arrangement of Example No. 4)

Except that the arrangements of the major-diameter portion 23 of the female member 2 and part of the arrangements of the retainer 3 differ from those of Example No. 1, Example No. 4 of the present quick connector assembly has the same arrangements as those of Example No. 1 with regard to the other arrangements involving the male member 1. Hence, Example No. 4 will be hereinafter described with respect to the specific points which differ from the arrangements of the female member 2 and retainer 3 of Example No. 1.

The arrangements of the female member 2 of Example No. 4 differ from those of Example No. 1 in terms of the following specific points.

Figure 17:
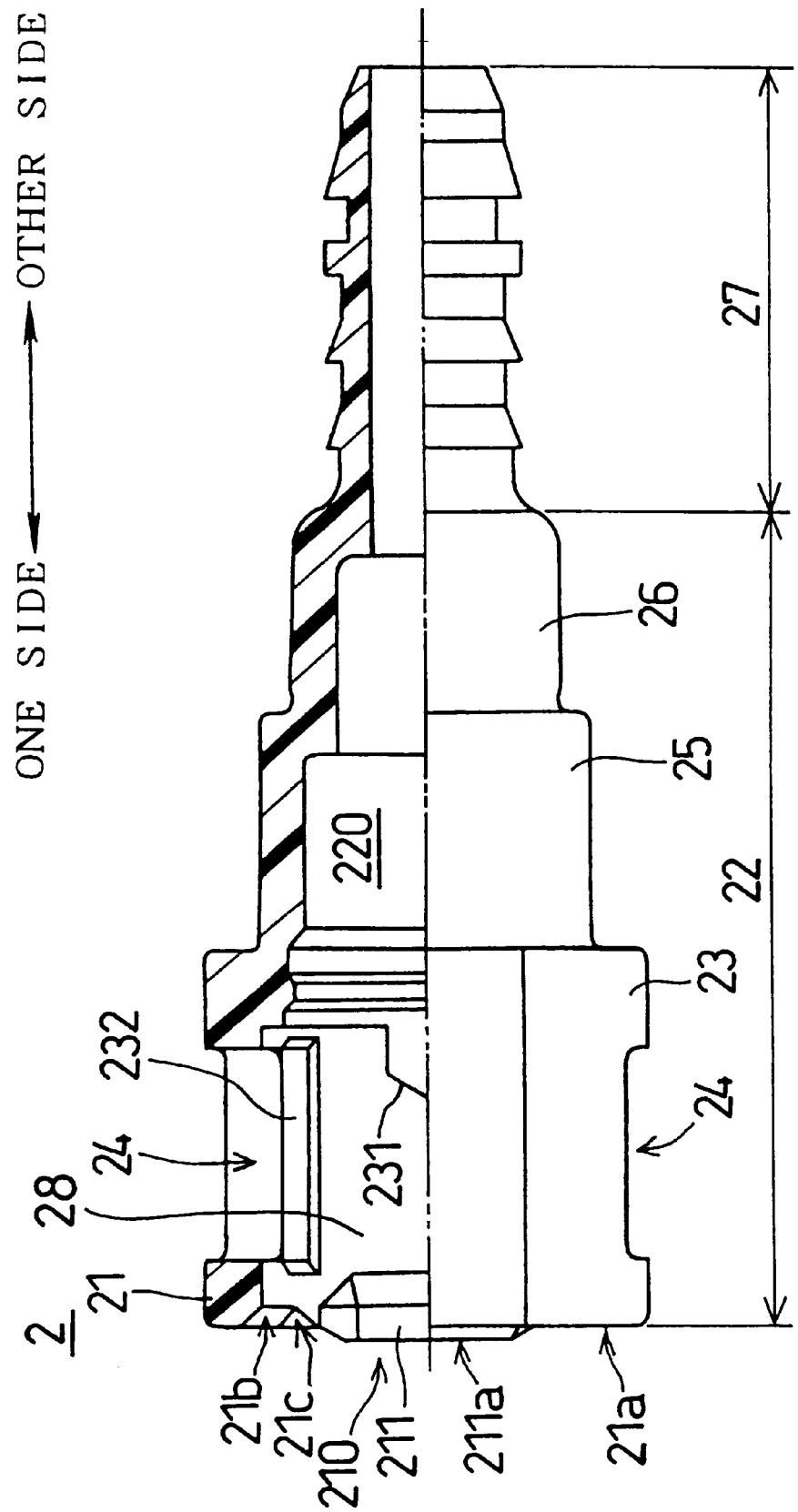
FIG. 17 is a semi-cross-sectional view for illustrating an arrangement of a female member of Example No. 4.
Figure 18:
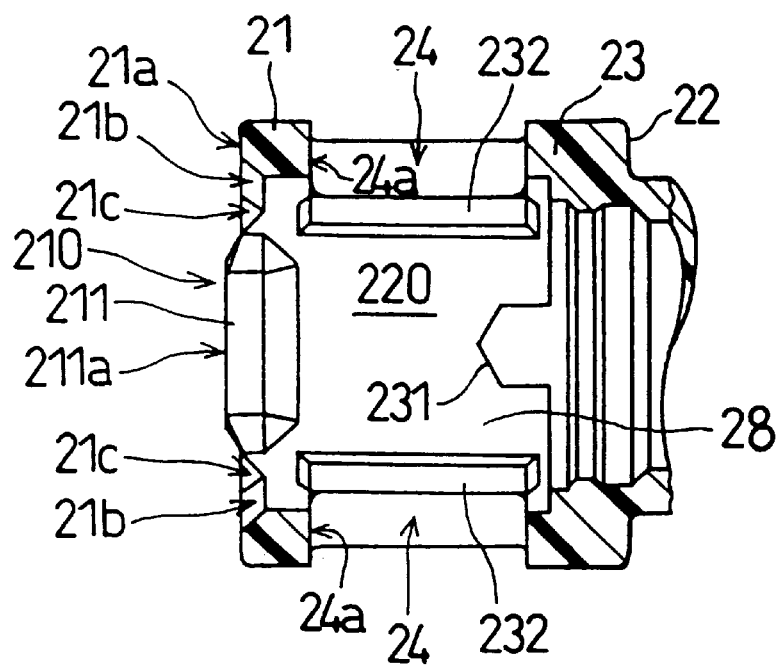
FIG. 18 is a plan-wise cross-sectional view for illustrating a major arrangement of the female member of Example No. 4.
Figure 19:
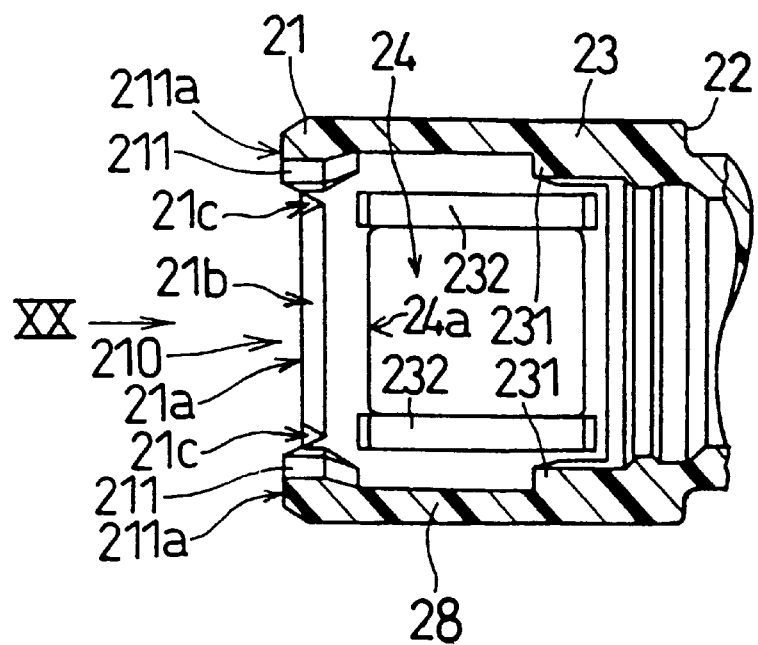
FIG. 19 is a side-wise cross-sectional view for illustrating the major arrangement of the female member of Example No. 4.

First, as illustrated in FIGS. 17 through 19, the female member 2 includes a pair of fitting projections 231. The pair of fitting projections 231 project from an inner peripheral wall 28 of the receiving portion 22 in a centripetal direction by a predetermined thickness, and are capable of fitting with the cut-off 330 of the retainer 3 when the retainer 3 is inserted into the receiving portion 22. Specifically, the pair of fitting projections 231 project from an inner peripheral wall 28 of the major-diameter portion 23 of the female member 2 in a centripetal direction, and are formed so as to face with each other. The fitting projections 231 are formed as a configuration which projects from the other-side end of the inner peripheral surface of the major-diameter portion 23 to the one side, and are tapered at the leading end so that they are likely to engage with the retainer 3.

Second, in an inner peripheral surface of the major-diameter portion 23 of the female member 2, there are formed guiding concavities 232. The guiding concavities 232 neighbor the windows 24, and are disposed on both sides of the windows 24 in a peripheral direction. Except the sides neighboring the windows 24, the other three sides of the guiding concavities 232 are formed as inclined surfaces. When the second engagement portions 35 of the retainer 3 fit with the guiding concavities 232, the retainer 3 is naturally rotated in the peripheral direction by its own elastic force. Thus, the second engagement portions 35 of the retainer 3 fit with the windows 24 of the female member 2.

Figure 20:
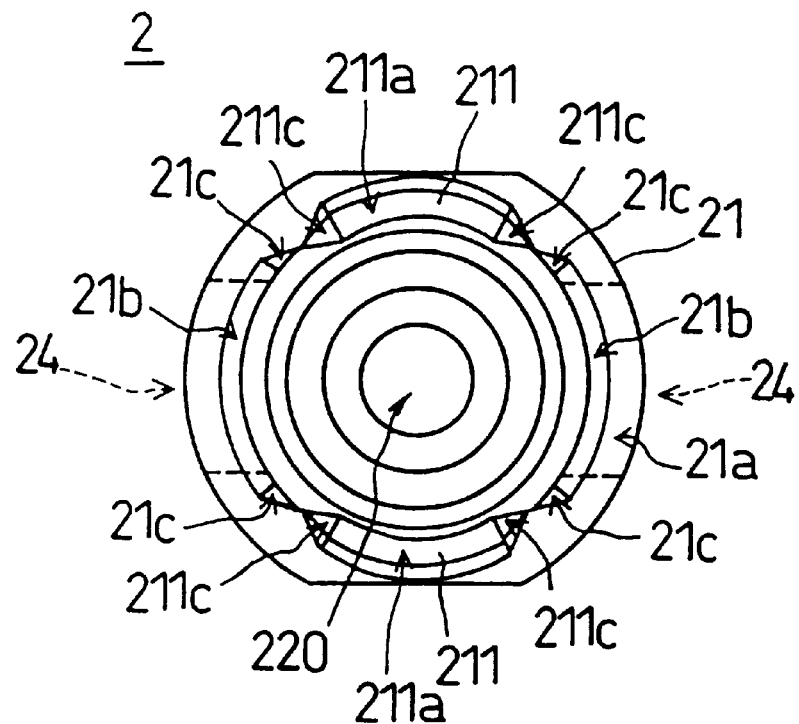
FIG. 20 is a rear view for illustrating an arrangement of an insertion opening end portion of the female member of Example No. 4.
Figure 21:
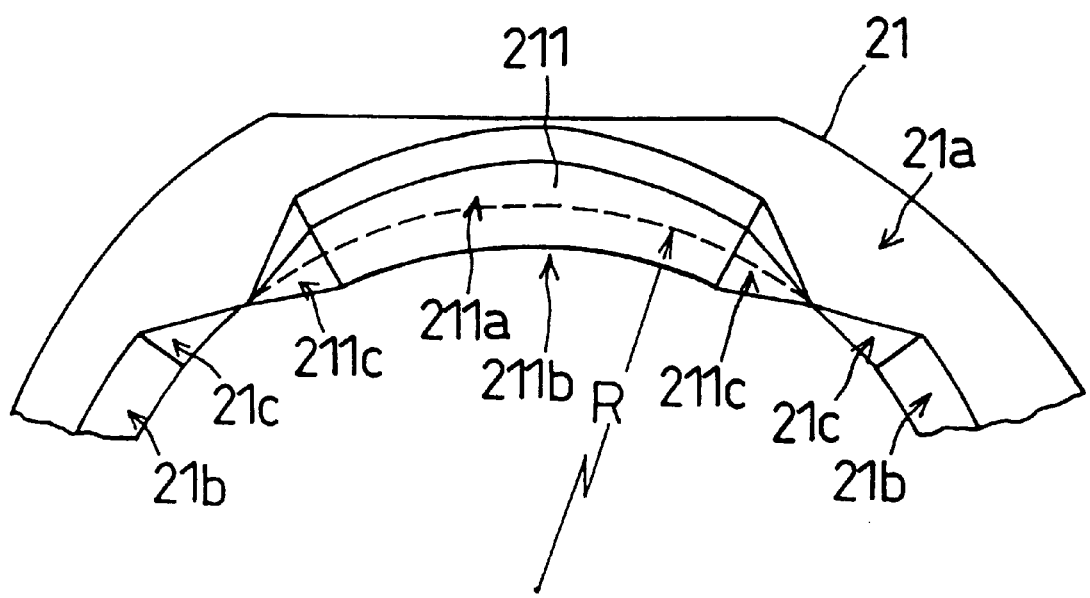
FIG. 21 is a partial rear view for illustrating a major arrangement of the insertion opening end portion of the female member of Example No. 4.
Figure 22:
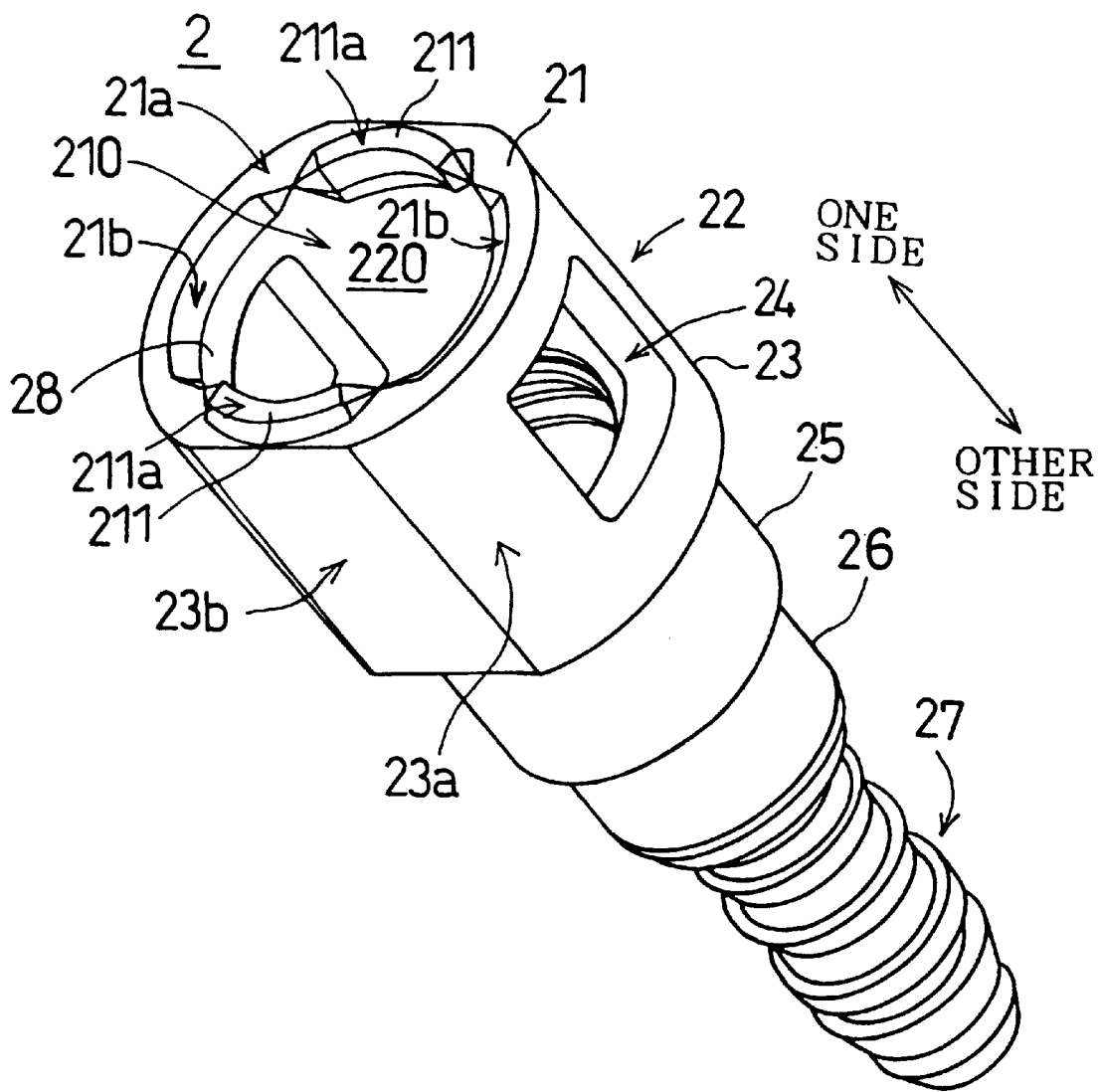
FIG. 22 is a perspective view for illustrating an overall configuration of the female member of Example No. 4.
Figure 23:
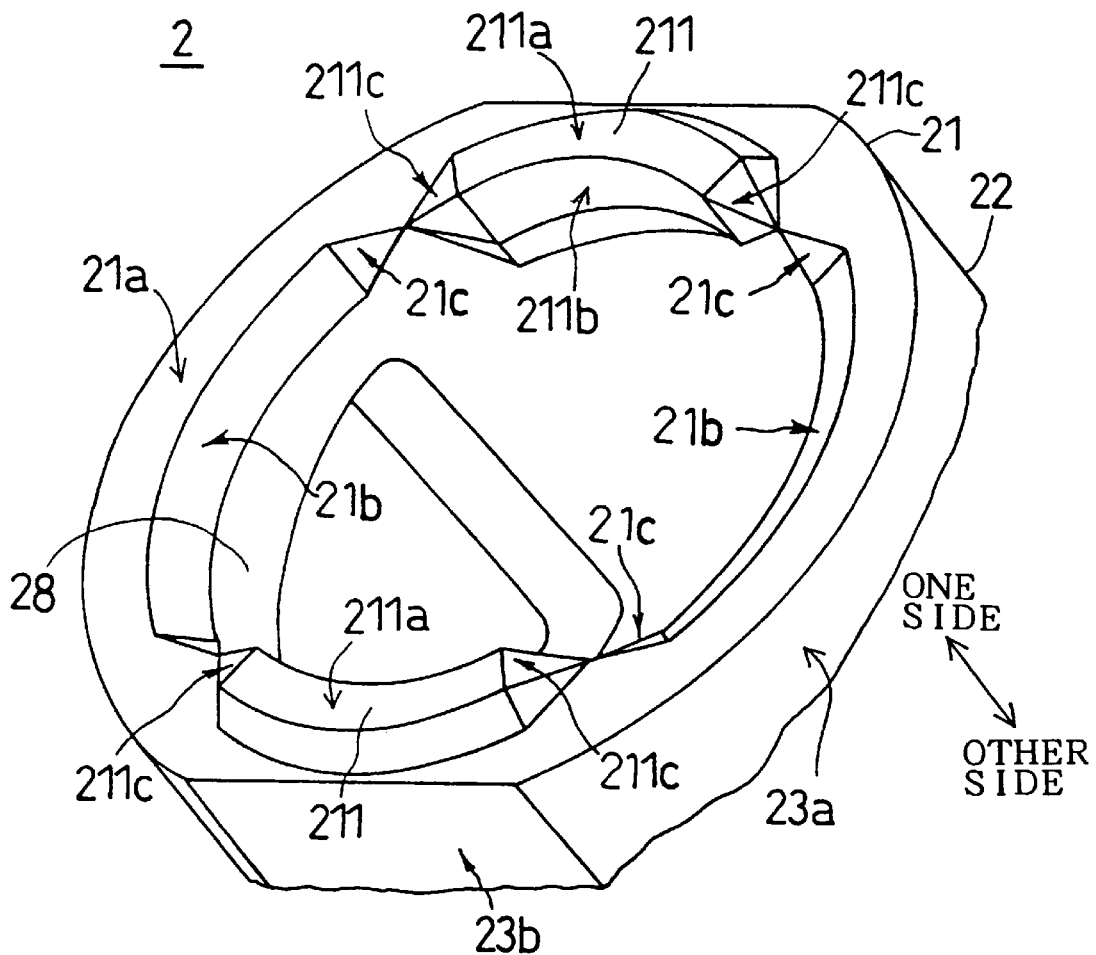
FIG. 23 is an enlarged perspective view for illustrating a configuration of the insertion opening end portion of the female member of Example No. 4.

Third, as illustrated in FIG. 20, the female member 2 includes a pair of regulatory projections 211. The pair of regulatory projections 211 are disposed at positions which are different from the positions where the pair of windows 24 (i.e., the first engagement portions) are disposed on the insertion opening end portion 21 in a peripheral direction thereof, project by a predetermined thickness in a centripetal direction thereof and extend by a predetermined width in a peripheral direction thereof. When the retainer 3 (See FIG. 24.) mounted onto the male member 1 (See FIG. 9.) is out of an appropriate rotary angle position, the regulatory projections 211 contact with the second engagement portions 35 of the retainer 3 to prevent the retainer 3 from being inserted into the receiving portion 22 of the female member 2. For instance, as illustrated in FIG. 21, the regulatory projections 211 project inward with respect to the inner peripheral surface of the insertion opening end portion 21 having a radius R. Accordingly, the regulatory projections 211 prevent the pair of second engagement portions 35, which project from the retainer 3 in the centrifugal direction, from going inward. In addition, as illustrated in FIG. 22, parts of the regulatory projections 211 project from the opening-end surface 21a of the insertion opening end portion 21 toward the one side in a trapezoid shape, and form regulatory end surfaces 211a. As illustrated in FIG. 23, inner side surfaces 211b of the regulatory projections 211 are a primary curved surface which is formed parallel to the longitudinal axis of the female member 2.

Fourth, as best shown in FIG. 22, the female member 2 includes chamfer-like guiding tapered surfaces 21b. The chamfer-like guiding tapered surfaces 21b are formed on portions in the insertion opening end portion 21, portions which correspond to the windows 24 (i.e., the first engagement portions), and continue from the opening-end surface 21a of the insertion opening end portion 21 to an inner peripheral wall 28 of the receiving portion 22. For example, the chamfer-like guiding tapered surfaces 21b are disposed only on peripheral portions in the insertion opening end portion 21, peripheral portions which correspond to the windows 24, and are formed in a pair facing with each other. The pair of chamfer-like guiding tapered surfaces 21b are spaced away from the pair of regulatory projections 211 by predetermined intervals.

Fifth, as best shown in FIG. 23, the female member 2 includes a pair of guiding inclined surfaces 21c. The guiding inclined surfaces 21c are disposed at opposite ends of the chamfer-like guiding tapered surfaces 21b, and continue from the opening-end surface 21a of the insertion opening end portion 21 to the chamfer-like guiding tapered surfaces 21b. When the second engagement portions 35 (See FIG. 24.) of the retainer 3 contact with the guiding inclined surfaces 21c with a pressing force, the guiding inclined surfaces 21c rotate the second engagement portions 35 in the peripheral direction to contact it with the chamfer-like guiding tapered surfaces 21b.

Sixth, as best shown in FIG. 23, the female member 2 includes guiding inclined surfaces 211c. The guiding inclined surfaces 211c are disposed at opposite ends of the regulatory projections 211, extend from the regulatory end surfaces 211a of the regulatory projections 211 in a peripheral direction, and reach the opening-end surface 21a. The leading ends of the guiding inclined surfaces 211c of the regulatory projections 211 contact with the leading ends of the guiding inclined surfaces 21c which are disposed at the opposite ends of the chamfer-like guiding tapered surfaces 21b. Accordingly, when the second engagement portions 35 of the retainer 3 contact with the guiding inclined surfaces 211c of the regulatory projections 211 with a pressing force, the second engagement portions 35 move in the peripheral direction while they slidably contact with the guiding inclined surfaces 211c and guiding inclined surfaces 21c. Consequently, when the second engagement portions 35 deviate from the regulatory projections 211 even slightly, the second engagement portions 35 can slide from the guiding inclined surfaces 211c onto the chamfer-like guiding tapered surfaces 21b via the guiding inclined surfaces 21c.

Whilst, the arrangements of the retainer 3 of Example No. 4 differ from those of Example No. 1 in terms of the following specific points.

Figure 24:
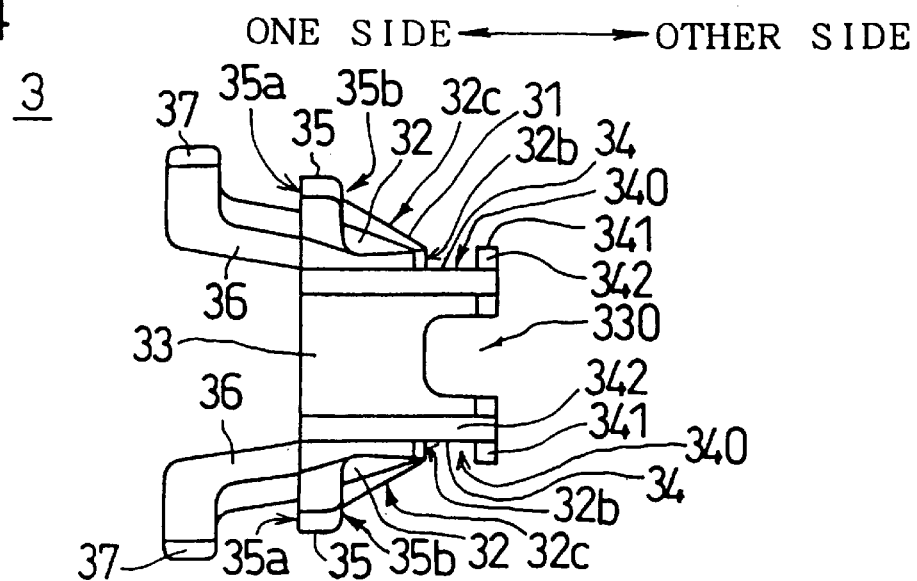
FIG. 24 is a side view for illustrating an arrangement of a retainer of Example No. 4.
Figure 25:
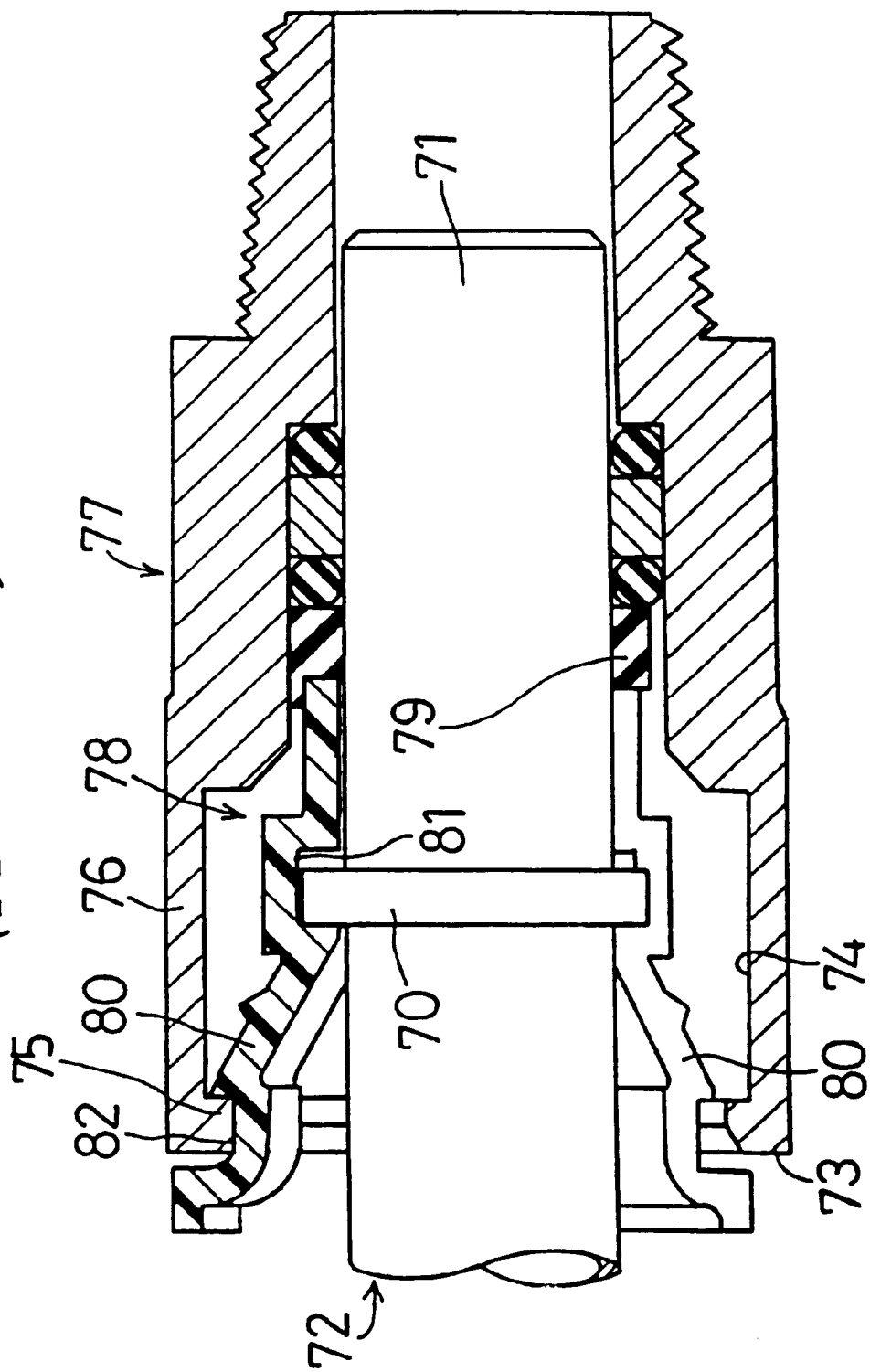
FIG. 25 is a cross-sectional view for illustrating an overall arrangement of the first type conventional quick connector assembly.
Figure 26:
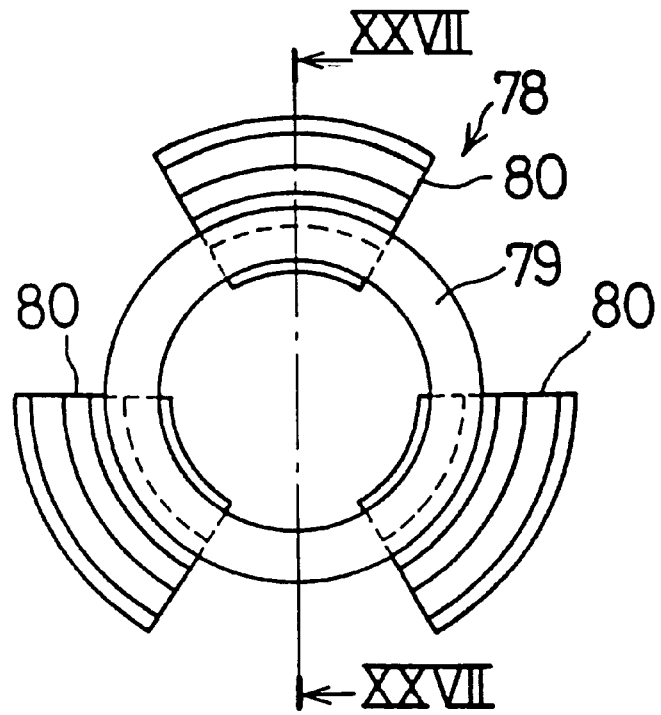
FIG. 26 is a rear view for illustrating an arrangement of a retainer of the first type conventional quick connector assembly.
Figure 27:
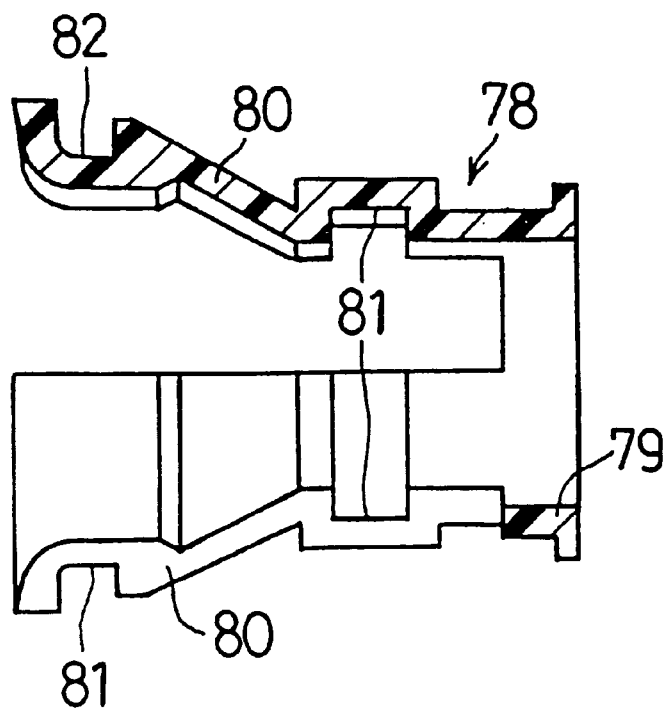
FIG. 27 is a side-wise cross-sectional view for illustrating the arrangement of the retainer of the first conventional quick connector assembly.
Figure 28:
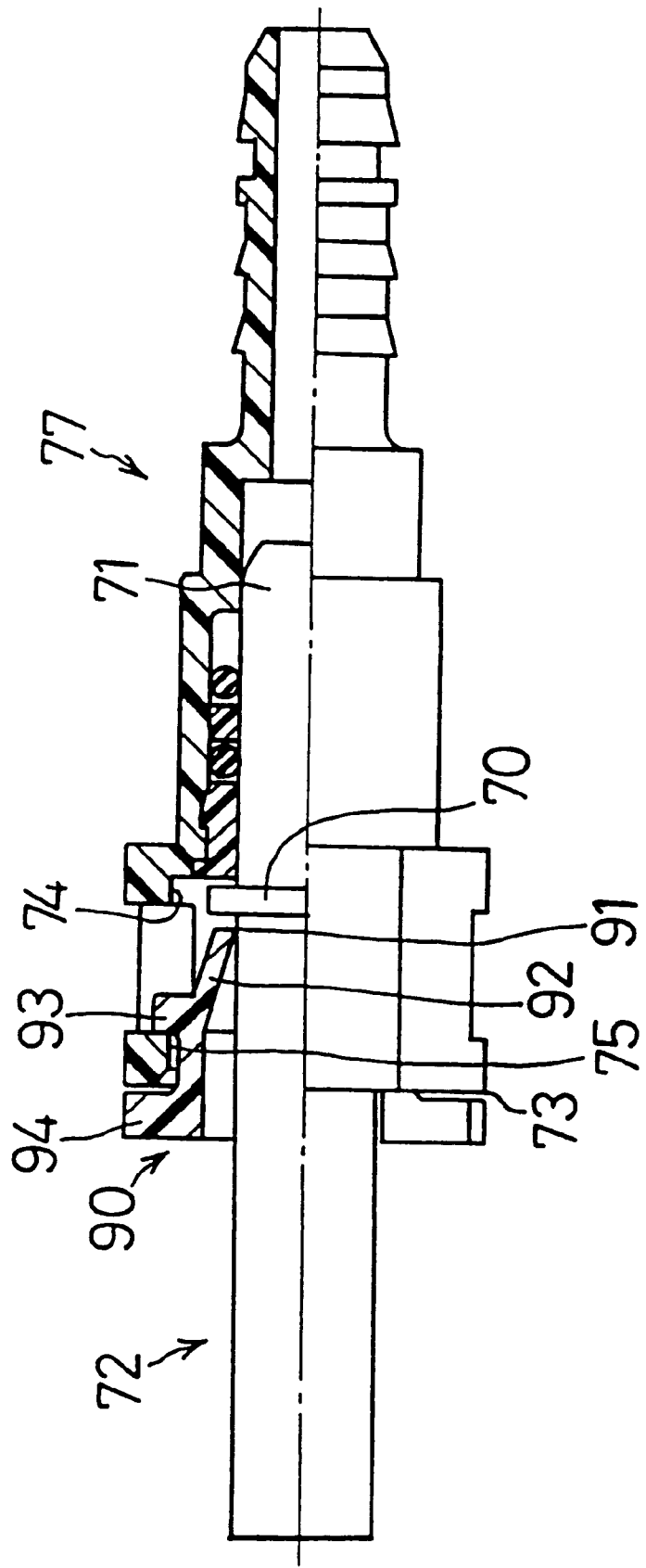
FIG. 28 is a semi-cross-sectional view for illustrating an overall arrangement of the second type conventional quick connector assembly.
Figure 29:
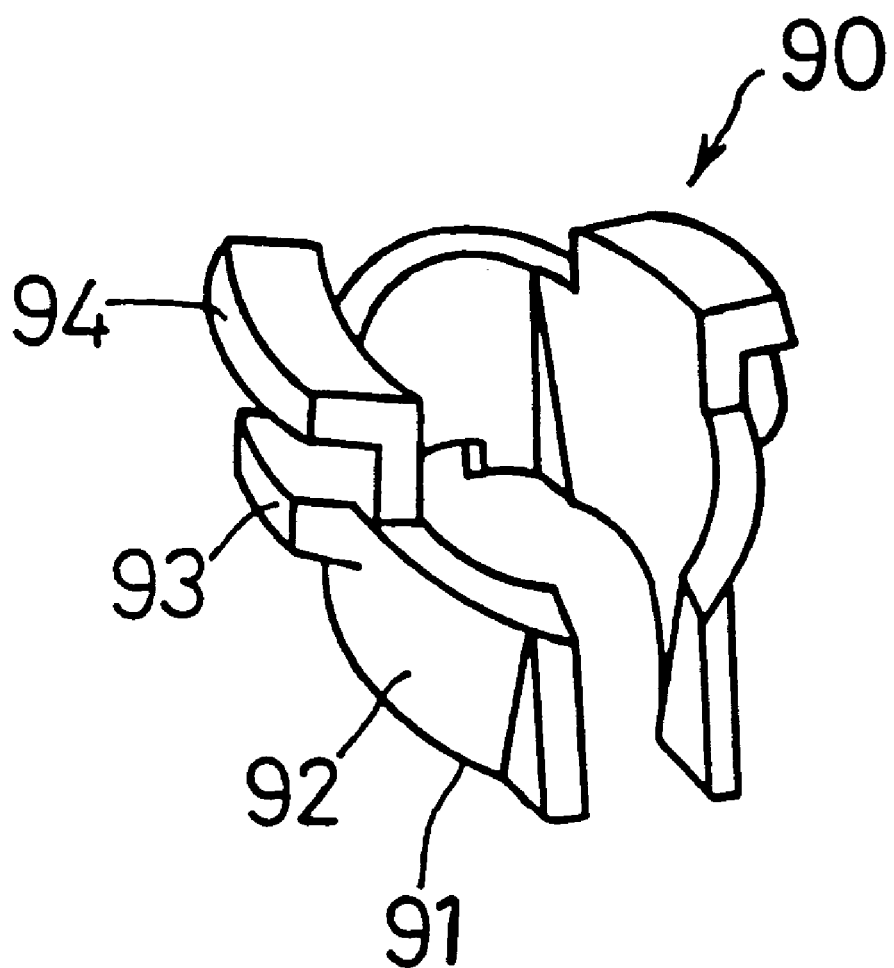
FIG. 29 is a perspective view for illustrating a configuration of the second type conventional quick connector assembly.

First, as illustrated in FIG. 24, the retainer 3 includes regulatory flat surfaces 35b. The regulatory flat surfaces 35b are disposed on the other sides of the second engagement portions 35, are formed perpendicularly to the axial direction, and have a predetermined area. When the retainer 3 mounted onto the male member 1 is out of an appropriate rotary angle position, the regulatory flat surfaces 35b contact with the regulatory end surfaces 211a of the regulatory projections 211 of the female member 2 so that they prevent the retainer 3 from being inserted into the receiving portion 22 of the female member 2. Note that the other-side-end corners of the second engagement portions 35 are rounded by giving an appropriate radius thereto. Thus, when the retainer 3 is at the appropriate rotary angle position, the other-side-end corners of the retainer 3 slidably contact with the chamfer-like guiding tapered surfaces 21b of the female member 2.

Second, the inclined surfaces 32c of the retainer 3 are formed straight from the regulatory flat surfaces 35b of the second engagement portions 35 to the holding portions 34. For example, the inclined surfaces 32c are formed as a substantially-cone-shaped tapered surface which is not bent or constricted at an intermediate portion between the regulatory flat surfaces 35b and the other-side end surfaces 32b of the tapered walls 32. Hence, when the male member 1 and female member 2 are connected and are pulled thereafter so that excessive compression loads act on the tapered walls 32 which constitute the inclined surfaces 32c, the tapered walls 32 are prevented from buckling locally.

Third, the corners of the cut-off 330 of the connector 33 are rounded by a predetermined radius to reduce the stress concentration. Consequently, the cut-off 330 is prevented from cracking starting at the corners. Hence, the retainer 3 can be reused a much larger number of times.

(Operations and Advantages of Example No. 4)

Example No. 4 of the present quick connector assembly is constructed as described above, and accordingly operates and produces advantages as hereinafter described.

First of all, let us assume the case where, although the retainer 3 (See FIG. 9.) fitted with the male member 1 is deviated from the correct rotary angle position by about 90° around the axis with respect to the female member 2, the worker tries to fit the retainer 3 into the female member 2. Note that the correct rotary angle position herein means the state in which the windows 24 (i.e., the first engagement portions) and the second engagement portions 35 are placed at the same angular positions. The other-side end surfaces (i e., the regulatory flat surfaces) 35b formed in the pair of second engagement portions 35 of retainer 3 contact with the regulatory end surfaces 211a of the regulatory projections 211 of the female member 2. Accordingly, the retainer 3 holding the male member 1 cannot be fitted further into the female member 2. Thus, even when the worker tries to fit the retainer 3 holding the male member 1 into the female member 2 with a fairly large pressing force, the fitting is prevented. Hence, the worker can easily recognize that the retainer 3 is deviated greatly from the correct rotary angle position with respect to the female member 2.

Then, let us assume the case where the worker tries to search the correct rotary angle position by rotating the retainer 3. When the other-side end surfaces (i.e., the regulatory flat surfaces) 35b of the second engagement portions 35 of the retainer 3 are deviated from the regulatory end surfaces 211a of the female member 2, the peripheral ends of the second engagement portions 35 of the retainer 3 contact with the guiding inclined surfaces 211c of the regulatory projections 211 of the female member 2. Since the retainer 3 is subjected to an external force which acts in the direction of pressing the retainer 3 into the female member 2, the peripheral ends of the second engagement portions 35 of the retainer 3 slidably contact with the guiding inclined surfaces 211c of the female member 2, and slide thereon. Subsequently, the peripheral ends of the second engagement portions 35 of the retainer 3 continue sliding on the guiding inclined surfaces 21c neighboring the guiding inclined surfaces 211c. As a result, the second engagement portions 35 of the retainer 3 come to contact with the chamfer-like guiding tapered surfaces 21b of the female member 2. In the meantime, the retainer 3 holding the male member 1 is fitted further into the female member 2 by a small distance.

When the second engagement portions 35 of the retainer 3 contact with the chamfer-like guiding tapered surfaces 21b of the female member 2, the retainer 3 is placed at the correct rotary angle position virtually. Nothing is present to prevent the retainer 3 from being inserted into the female member 2. Hence, the retainer 3 holding the male member 1 can be fitted further into the female member 2 while it is reduced diametrically. Thus, the second engagement portions 35 of the retainer 3 pass the insertion opening end portion 21 of the female member 2 so that they are inserted into the receiving portion 22. Then, the leading ends of the pair of fitting projections 231 (See FIG. 18) of the female member 2 start fitting with the cut-off 330 of the connector 33 of the retainer 3 as well as with the letter-C-shaped opening of the body 31 of the retainer 3. The leading ends of the fitting projections 231 are tapered as aforementioned. Accordingly, even if the retainer 3 is deviated from the correct rotary angle position slightly, it is inserted into the receiving portion 22 of the female member 2 while correcting the rotary angle position. In the meantime, since the second engagement portions 35 are urged outward by the elastic force of the retainer 3, they are led to the windows 24 by the guiding concavities 232 (See FIGS. 18 and 19), which are formed on both sides of the windows 24 of the female member 2. When the retainer 3 holding the male member 1 is inserted into the receiving portion 22 of the female member 2 by a predetermined depth, the second engagement portions 35, urged outward by the elastic force of the retainer 3, come to fit with the windows 24 working as the first engagement portions.

Once the second engagement portions 35 of the retainer 3 fit with the windows 24 of the female member 2, the connection between the male member 1 and female member 2 cannot be disconnected by pushing or pulling the male member 1 or female member 2 unless the worker operates the operation arms 36. This engagement action exhibited by the retainer 3 is the same as that of Example No. 1.

In Example No. 4 of the present quick connector assembly, the male member 1 and female member 2 can be connected with ease by simply positioning the retainer 3 holding the male member 1 within a wide range to a certain extent about the correct rotary angle position with respect to the female member 2 and pushing it into the female member 2. As a result, in addition to the advantages produced by above-described Example No. 1, Example No. 4 produces the following advantages. Not only the work load to the worker is relieved so that the working time can be diminished, but also the present quick connector assembly can be connected more reliably.

Moreover, since the guiding concavities 232 are disposed by the windows 24 of the female member 2, the body 31 of the retainer 3 is likely to enlarge diametrically when the male member 1 is inserted into the female member 2 which has been holding the retainer 3 in the major-diameter portion 23 in advance. Thus, it is possible to reduce the force required for fitting the male member 1 into the retainer 3 and female member 2.

Having now fully described the present invention, it will be apparent to one of ordinary skill in the art that many changes and modifications can be made thereto without departing from the spirit or scope of the present invention as set forth herein including the appended claims.

What is claimed is:

1. A quick connector assembly, comprising:
   a male member including a substantially-pipe-shaped insertion end portion, the insertion end portion having a ring-shaped projection disposed away from a tip by a predetermined distance and projecting in centrifugal direction;
   a female member including an insertion opening end portion and a receiving portion adjacent to the insertion opening end portion being opened on one side in an axial direction, the receiving portion including a peripheral wall, the peripheral wall including a first engagement portion, the first engagement portion having an engagement surface facing other side in the axial direction and extending in a radial direction, whereby the insertion end portion of said male member is inserted into the receiving portion from the insertion opening end portion; and
   a retainer, at least part of the retainer inserted into the receiving portion from the insertion opening end portion of said female member, interposed between the ring-shaped projection of said male member and the engagement surface of said female member, whereby the insertion end portion of said male member, the insertion end portion being inserted into the receiving portion from the insertion opening end portion, is installed in the receiving portion of said female member,
   said retainer including:
      a body formed as a substantially letter C shape in cross-section with a space separating both ends of the body, said space being smaller than the outer diameter of said insertion end portion of said male member, said body being capable of enlarging and reducing diametrically by elastic deformation, and having: a tapered wall whose inner peripheral surface is reduced diametrically toward the other side;

and a holding portion disposed on an other-side end of the tapered wall, and fitting with the ring-shaped projection of the insertion end portion of said male member to hold the insertion end portion;

a second engagement portion formed as a detent, and engaging with the first engagement portion, the detent projecting from a one-side end of the body in centrifugal direction and formed integrally with the body: and a plurality of operation arms projecting from the one-side end of the body toward the one side, and disposed back to back, having an operation end portion protruding beyond the insertion opening end portion, and disengaging said second engagement portion from said first engagement portion by reducing said body diametrically.

2. The quick connector assembly according to claim 1, wherein an outer side surface of the body of said retainer has an inclined surface which approaches the axis as it develops from the second engagement portion to the other side.

3. The quick connector assembly according to claim 1, wherein the first engagement portion is a pair of windows which face with each other and are opened in the peripheral wall of the receiving portion; and the engagement surface of the first engagement portion is part of an opening inner surface of the windows.

4. The quick connector assembly according to claim 1, wherein the holding portion of said retainer includes an aperture window with which part of the ring-shaped projection of said male member fits.

5. The quick connector assembly according to claim 4, wherein the receiving portion of said female member includes a window in the peripheral wall, the window being disposed at a position at which the aperture window of said retainer is observed from the outside.

6. The quick connector assembly according to claim 1, wherein the body of said retainer includes a plurality of the holding portions and a cut-off between the holding portions neighboring in a peripheral direction, the cut-off being formed from the other side.

7. The quick connector assembly according to claim 6, wherein said female member includes a fitting projection, the fitting projection projecting from an inner peripheral wall of the receiving portion in a centripetal direction by a predetermined thickness, and being capable of fitting with the cut-off of said retainer when said retainer is inserted into the receiving portion.

8. The quick connector assembly according to claim 1, wherein said female member includes a regulatory projection formed on the insertion opening end portion, the regulatory projection disposed at a position different from the position where the first engagement portion is disposed in a peripheral direction, and projecting by a predetermined thickness in a centripetal direction; and the regulatory projection works as a projection which prevents said retainer from being inserted into the receiving portion of said female member by contacting with the second engagement portion of said retainer when said retainer mounted onto said male member is out of an appropriate rotary angle position.

9. The quick connector assembly according to claim 8, wherein said retainer includes a regulatory flat surface, the regulatory flat surface disposed on the other side of the second engagement portion and formed perpendicularly to the axial direction; and the regulatory flat surface works as a flat surface which prevents said retainer from being inserted into the receiving portion of said female member by contacting with an end surface of the regulatory projection of said female member when said retainer mounted onto said male member is out of an appropriate rotary angle position.

10. The quick connector assembly according to claim 1, wherein said female member includes a chamfer-like guiding tapered surface, the chamfer-like guiding tapered surface being formed on a specific portion in the insertion opening end portion, specific portion which corresponds to the first engagement portion, and continuing from an end surface of the insertion opening end portion to an inner surface of the peripheral wall of the receiving portion.

11. The quick connector assembly according to claim 10, wherein said female member includes a pair of guiding inclined surfaces, the guiding inclined surfaces disposed at opposite ends of the chamfer-like guiding tapered surface, and continuing from the end surface of the insertion opening end portion to the chamfer-like guiding tapered surface.

12. The quick connector assembly according to claim 1, wherein said receiving portion of said female member has a major-diameter portion, an intermediate-diameter portion, and a minor-diameter portion, the major diameter portion accommodating the ring-shaped projection of said male member and the body and second engagement portion of said retainer, the intermediate-diameter portion having an inside diameter smaller than that of the major-diameter portion and holding a ring-shaped sealing member which contacts with an inner peripheral surface of the receiving portion and an outer peripheral surface of the insertion end portion of said male member, the minor-diameter portion having an inside diameter smaller than that of the intermediate diameter portion and accommodating the tip of said male member.

13. The quick connector assembly according to claim 4, wherein the receiving portion of said female member includes windows opened in the peripheral wall; and the quick connector assembly further comprises a checking member including: a letter-C-shaped portion installed to the receiving portion from an outer peripheral side of the receiving portion of said female member, and being capable of enlarging diametrically by elastic deformation; and a pair of engagement projections projecting from opposite ends of the letter-C-shaped portion in a radial direction inward, and inserted into the aperture window of the holding portion of said retainer by way of the windows of the receiving portion;

when the connection between said male member and female member is completed, the checking member operates so that the engagement projections are pushed out of the aperture window of the holding portion of said retainer in centrifugal direction by an outer peripheral surface of the ring-shaped projection of said male member, and the letter-C-shaped portion is enlarged diametrically.

14. A quick connector, comprising:

a female member including an insertion opening end portion and a receiving portion adjacent to the insertion opening end portion being opened on one side in an axial direction, the receiving portion including a peripheral wall, the peripheral wall including a first engagement portion, the first engagement portion having an engagement surface facing other side in the axial direction and extending in a radial direction, whereby a substantially-pipe-shaped insertion end portion of a male member is to be inserted into the receiving portion from the insertion opening end portion, the substantially-pipe-shaped insertion end portion having a ring-shaped projection, the ring-shaped projection disposed away from a tip of a male member and projecting in centrifugal direction; and a retainer, at least part of the retainer inserted into the receiving portion from the insertion opening end portion of said female member, to be interposed between the ring-shaped projection of said male member and the engagement surface of said female member, whereby the insertion end portion of said male member, the insertion end portion to be inserted into the receiving portion from the insertion opening end portion, is installed in the receiving portion of said female member, said retainer including: a body formed as a substantially letter C shape in cross-section with a space separating both ends of the body, said space being smaller than the outer diameter of said insertion end portion of said male member, said body being capable of enlarging and reducing diametrically by elastic deformation, and having: a tapered wall whose inner peripheral surface is reduced diametrically toward the other side; and a holding portion disposed on an other-side end of the tapered wall, and to be fitting with the ring-shaped projection of the insertion end portion of said male member to hold the insertion end portion;

a second engagement portion formed as a detent, and engaging with the first engagement portion, the detent projecting from a one-side end of the body in centrifugal direction and formed integrally with the body; and a plurality of operation arms projecting from the one-side end of the body toward the one side, and disposed back to back, having an operation end portion protruding beyond the insertion opening end portion, and disengaging said second engagement portion from said first engagement portion by reducing said body diametrically.

15. A retainer for a quick connector, wherein at least part of the retainer is to be inserted into a receiving portion of a female member from an insertion opening end portion thereof, the insertion opening end portion opened on one side in an axial direction, the receiving portion including a peripheral wall, the peripheral wall including a first engagement portion, the first engagement portion having an engagement surface facing other side in the axial direction and extending in a radial direction; and wherein the retainer is to be interposed between a ring-shaped projection and the engagement surface of said female member, the ring-shaped projection disposed at an intermediate portion of a substantially-pipe-shaped insertion end portion of a male member and projecting in centrifugal direction, the male member to be inserted into the receiving portion of said female member; whereby the insertion end portion of said male member, the insertion end portion to be inserted into the receiving portion from the insertion opening end portion, is to be installed in the receiving portion of said female member, said retainer including: a body formed as a substantially letter C shape in cross-section with a space separating both ends of the body, said space being smaller than the outer diameter of said insertion end portion of said male member, said body being capable of enlarging and reducing diametrically by elastic deformation, and having: a tapered wall whose inner peripheral surface is reduced diametrically toward the other side; and a holding portion disposed on an other-side end of the tapered wall, and to be fitting with the ring-shaped projection of the insertion end portion of said male member to hold the insertion end portion;

a second engagement portion formed as a detent, and to be engaging with the first engagement portion, the detent projecting from a one-side end of the body in centrifugal direction and formed integrally with the body; and a plurality of operation arms projecting from the one-side end of the body toward the one side, and disposed back to back, having an operation end portion to be protruding beyond the insertion opening end portion, and to be disengaging said second engagement portion from said first engagement portion by reducing said body diametrically.

16. A combination in a coupling for a conduit comprising a male member, a female member, a retainer, a sealing member and a bushing member;

said male member including a substantially pipe-shaped insertion end portion, said insertion end portion having a ring-shaped projection disposed away from a tip by a predetermined distance and projecting in a centrifugal direction;

said female member formed with an axial bore for providing a fluid path and including a receiving portion adjusting to an insertion opening end portion being opened on one-side in an axial direction, said receiving portion having a peripheral wall, the peripheral wall including a first engagement portion, the first engagement portion having an engagement surface facing other side in the axial direction and extending in a radial direction;

said retainer detachably coupled to said first engagement portion of said female member for cooperating with said ring-shaped projection to resist the disconnection of said male member from said female member;

said retainer including a generally cylindrically shaped resilient body formed as substantially C shaped in cross section, a tapered wall whose inner peripheral surface is reduced diametrically toward the other side, a holding portion disposed at an other side end of said body adjacent to said other side of said tapered wall portion and adapted to receive said ring-shaped portion to prevent an axial movement of said male member, and a second engagement portion formed as a detente and engaging with the first engagement when said retainer is positioned in place within said receiving portion of said female member, said detente projecting from an outer surface of a one-side end of said body in centrifugal direction and formed integrally with said body;

said body of said retainer including a space which permits radial compression of said body so that said retainer can be detachably coupled to said receiving portion of said female member, and which permits radial expansion of said body so that retainer can be removably mounted on said holding portion of said retainer and passes through in a direction substantially perpendicular to the axial direction to prevent an axial movement of said male member;

said sealing member disposed within said axial bore for providing a fluid tight seal between a confronting portion of said male member and said female member; and said bushing member disposed between said sealing member and said retainer in an axial direction for preventing said sealing member from being expelled from said axial bore of said female member.

* * * * *